United States Patent
Seok

(10) Patent No.: US 9,936,370 B2
(45) Date of Patent: Apr. 3, 2018

(54) SCANNING METHOD AND APPARATUS IN WIRELESS LAN SYSTEM

(71) Applicant: LG ELECTRONICS INC., Seoul (KR)

(72) Inventor: Yongho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/654,120

(22) PCT Filed: Nov. 8, 2013

(86) PCT No.: PCT/KR2013/010120
§ 371 (c)(1),
(2) Date: Jun. 19, 2015

(87) PCT Pub. No.: WO2014/104565
PCT Pub. Date: Jul. 3, 2014

(65) Prior Publication Data
US 2015/0319599 A1    Nov. 5, 2015

Related U.S. Application Data

(60) Provisional application No. 61/745,814, filed on Dec. 25, 2012, provisional application No. 61/832,712, filed on Jun. 7, 2013.

(51) Int. Cl.
*H04W 8/00*        (2009.01)
*H04W 84/12*     (2009.01)
*H04W 48/16*     (2009.01)

(52) U.S. Cl.
CPC ........... *H04W 8/005* (2013.01); *H04W 48/16* (2013.01); *H04W 84/12* (2013.01)

(58) Field of Classification Search
None
See application file for complete search history.

(56) References Cited

U.S. PATENT DOCUMENTS

2009/0075653 A1*  3/2009  Yeom ................... H04W 72/02
                                                                    455/434
2011/0255401 A1* 10/2011  Seok .................... H04W 48/20
                                                                    370/230

(Continued)

FOREIGN PATENT DOCUMENTS

CN       101141335        3/2008
CN       102752823       10/2012

(Continued)

OTHER PUBLICATIONS

PCT International Application No. PCT/KR2013/010120, Written Opinion of the International Searching Authority dated Feb. 26, 2014, 20 pages.

(Continued)

*Primary Examiner* — Adnan Baig
(74) *Attorney, Agent, or Firm* — Lee Hong Degerman Kang Waimey

(57) ABSTRACT

The present invention relates to a wireless communication system and, more particularly, to an improved scanning method and apparatus in a wireless LAN system. A method by which an access point (AP) supports the scanning of a station (STA) in a wireless LAN system, according to one embodiment of the present invention, includes the steps of: receiving, by the AP which supports first and second channel widths, a probe request frame in the first channel width or second channel width from the STA; and transmitting a probe response frame, which responds to the probe request frame, to the STA. When the probe request frame is received in the first channel width, the probe response frame can be transmitted in said first channel width. When the probe (Continued)

request frame is received in the second channel width, the probe response frame can be transmitted in said second channel width.

9 Claims, 13 Drawing Sheets

(56) References Cited

U.S. PATENT DOCUMENTS

| | | | |
|---|---|---|---|
| 2012/0099664 A1 | 4/2012 | Cheong et al. | |
| 2012/0314673 A1 | 12/2012 | Noh et al. | |
| 2013/0107829 A1* | 5/2013 | Shao | H04W 72/02 370/329 |
| 2013/0155976 A1* | 6/2013 | Chen | H04W 72/0453 370/329 |
| 2013/0232253 A1* | 9/2013 | Elhaddad | H04W 8/005 709/224 |

FOREIGN PATENT DOCUMENTS

| | | |
|---|---|---|
| JP | 2010529730 | 8/2010 |
| KR | 10-2006-0031867 | 4/2006 |
| KR | 10-2009-0029479 | 3/2009 |
| KR | 10-2011-0003389 | 1/2011 |
| KR | 10-2012-0079055 | 7/2012 |
| WO | 2012040495 | 3/2012 |

OTHER PUBLICATIONS

European Patent Office Application No. 13867814.9, Search Report dated Jun. 29, 2016, 7 pages.

Seok, et al., "SIG Field of NDP Probe Request", IEEE 802.11-12/1080r0, Sep. 17, 2012, 9 pages.

The State Intellectual Property Office of the People's Republic of China Application Serial No. 201380068035.2, Office Action dated Nov. 16, 2017, 7 pages.

* cited by examiner

| FC | DA | SA | Timestamp | Change Sequence | Next TBTT | Compressed SSID | Access Network Option | Optional IEs | FCS |
|---|---|---|---|---|---|---|---|---|---|
| Octets: 2 | 6 | 6 | 4 | 1 | 0 or 3 | 4 | 0 or 1 | variable | 4 |

| Protocol Version | Type | Subtype | Next TBTT Present | Full SSID Present | Interworking Present | BSS BW | Security |
|---|---|---|---|---|---|---|---|
| Bits: 2 | 2 | 4 | 1 | 1 | 1 | 4 | 1 |

SCANNING METHOD AND APPARATUS IN WIRELESS LAN SYSTEM

CROSS-REFERENCE TO RELATED APPLICATIONS

This application is the National Stage filing under 35 U.S.C. 371 of International Application No. PCT/KR2013/010120, filed on Nov. 8, 2013, which claims the benefit of U.S. Provisional Application No. 61/745,814, filed on Dec. 25, 2012 and 61/832,712, filed on Jun. 7, 2013, the contents of which are all hereby incorporated by reference herein in their entirety.

TECHNICAL FIELD

The following description relates to a wireless communication system and, more particularly, to an improved scanning method and apparatus in a wireless local area network (WLAN) system.

BACKGROUND ART

Recently, with development of information and communication technology, a variety of wireless communication technologies have been developed. Among such wireless communication technologies, a wireless local area network (WLAN) refers to technology for wirelessly accessing the Internet at home, at work or in a specific service provision area based on radio frequency technology using portable terminals such as personal digital assistants (PDAs), laptops, portable multimedia players (PMPs).

To overcome limited communication speed which has conventionally been a weak point of a WLAN, in the recent technical standard, a system for increasing the speed and reliability of a network and increasing the coverage of a wireless network has been introduced. For example, in IEEE 802.11n, multiple input multiple output (MIMO) technology using multiple antennas in a transmitter and a receiver in order to achieve high throughput (HT) of 540 Mbps or more, minimize transmission errors and optimize a data rate has been introduced.

DISCLOSURE

Technical Problem

As next-generation communication technology, machine-to-machine (M2M) communication technology has been discussed. Even in an IEEE 802.11 WLAN system, the technical standard supporting M2M communication has been developed as IEEE 802.11ah. In M2M communication, a scenario in which a small amount of data is transmitted and received at a low rate in an environment, in which a large number of apparatuses exists, may be considered.

An object of the present invention devised to solve the problem lies in an improved scanning method and apparatus capable of minimizing power consumption of an apparatus for performing scanning.

The technical problems solved by the present invention are not limited to the above technical problems and other technical problems which are not described herein will become apparent to those skilled in the art from the following description.

Technical Solution

The object of the present invention can be achieved by providing a method of supporting scanning of a station (STA) at an access point (AP) in a wireless local area network (WLAN) system including, at the AP supporting a first channel width and a second channel width, receiving a probe request frame from the STA in the first channel width or the second channel width, and transmitting a probe response frame to the STA in response to the probe request frame, wherein, if the probe request frame is received in the first channel width, the probe response frame is transmitted in the first channel width, and wherein the probe request frame is received in the second channel width, the probe response frame is transmitted in the second channel width.

In another aspect of the present invention, provided herein is a method of performing scanning at a station (STA) in a wireless local area network (WLAN) system including, to an access point (AP) supporting a first channel width and a second channel width, transmitting a probe request frame in the first channel width or the second channel width, and receiving a probe response frame from the AP in response to the probe request frame, wherein, if the probe request frame is transmitted in the first channel width, the probe response frame is received in the first channel width, and wherein the probe request frame is transmitted in the second channel width, the probe response frame is received n the second channel width.

In another aspect of the present invention, provided herein is an access point (AP) apparatus for supporting scanning of a station (STA) in a wireless local area network (WLAN) system including a transceiver and a processor, wherein the AP apparatus supports a first channel width and a second channel width, wherein the processor is configured to receive a probe request frame from the STA using the transceiver in the first channel width or the second channel width and to transmit a probe response frame to the STA using the transceiver in response to the probe request frame, wherein, if the probe request frame is received in the first channel width, the probe response frame is transmitted in the first channel width, and wherein the probe request frame is received in the second channel width, the probe response frame is transmitted in the second channel width.

In another aspect of the present invention, provided herein is a station (STA) apparatus for performing scanning in a wireless local area network (WLAN) system including a transceiver and a processor, wherein the processor is configured to transmit, to an access point (AP) supporting a first channel width and a second channel width, a probe request frame using the transceiver in the first channel width or the second channel width and to receive a probe response frame from the AP using the transceiver in response to the probe request frame, wherein, if the probe request frame is transmitted in the first channel width, the probe response frame is received in the first channel width, and wherein the probe request frame is transmitted in the second channel width, the probe response frame is received in the second channel width.

The embodiments of the present invention may include the following features.

If the probe request frame is received in the second channel width, the probe response frame may not be permitted to be transmitted in the first channel width.

If the probe request frame is received in the first channel width, the probe response frame may not be permitted to be transmitted in the second channel width.

The probe response frame may include information about a location of a channel having the second channel width.

The information about the location of the channel having the first channel width may indicate that the channel having the first channel width is located at a lower side of a channel having the second channel width.

The information about the location of the channel having the first channel width may indicate that the channel having the first channel width is located at an upper side of a channel having the second channel width.

The information about the location of the channel having the first channel width may be included in a frame control (FC) field of the probe response frame.

The first channel width may be narrower than the second channel width.

The first channel width may be 1 MHz and the second channel width may be 2 MHz.

It is to be understood that both the foregoing general description and the following detailed description of the present invention are exemplary and explanatory and are intended to provide further explanation of the invention as claimed.

Advantageous Effects

According to the present invention, it is possible to provide an improved scanning method and apparatus capable of minimizing power consumption of an apparatus for performing scanning.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
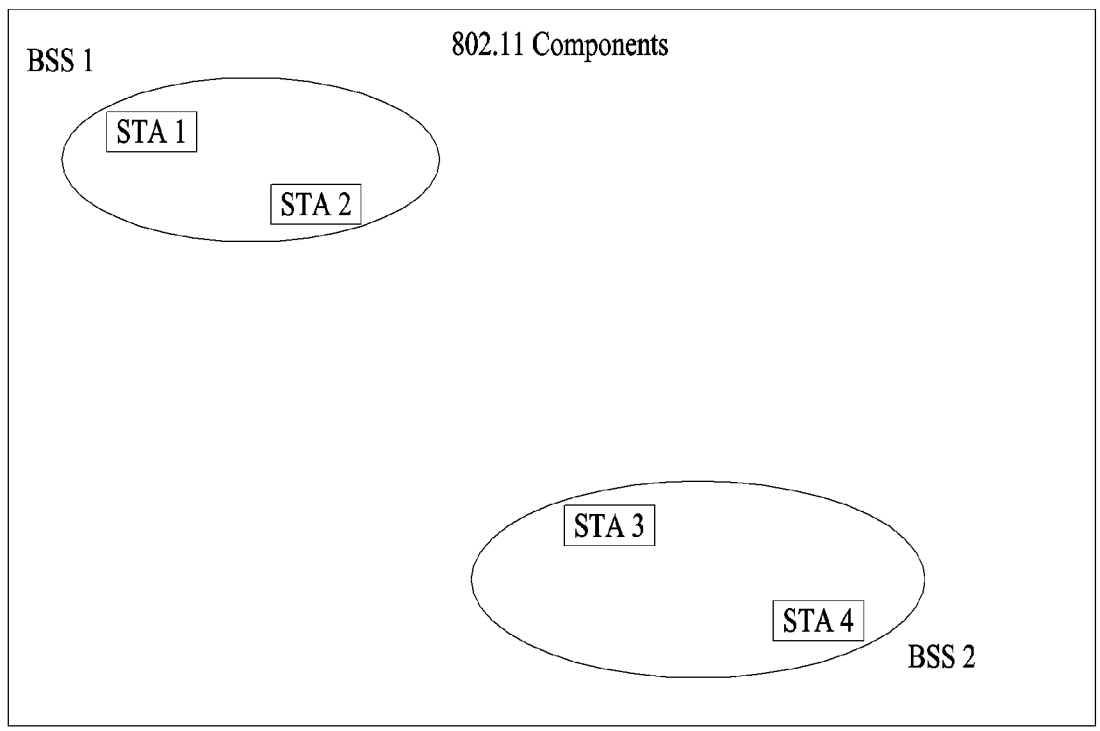
FIG. 1 is a diagram showing an exemplary structure of an IEEE 802.11 system to which the present invention is applicable.

Hereinafter, exemplary embodiments of the present invention will be described with reference to the accompanying drawings. The detailed description, which will be disclosed along with the accompanying drawings, is intended to describe exemplary embodiments of the present invention and is not intended to describe a unique embodiment through which the present invention can be carried out. The following detailed description includes specific details in order to provide a thorough understanding of the present invention. However, it will be apparent to those skilled in the art that the present invention may be practiced without such specific details.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

Specific terms used in the following description are provided to aid in understanding of the present invention. These specific terms may be replaced with other terms within the scope and spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

The embodiments of the present invention can be supported by standard documents disclosed for at least one of wireless access systems such as the institute of electrical and electronics engineers (IEEE) 802, 3rd generation partnership project (3GPP), 3GPP long term evolution (3GPP LTE), LTE-advanced (LTE-A), and 3GPP2 systems. For steps or parts of which description is omitted to clarify the technical features of the present invention, reference may be made to these documents. Further, all terms as set forth herein can be explained by the standard documents.

The following technology can be used in various wireless access systems such as systems for code division multiple access (CDMA), frequency division multiple access (FDMA), time division multiple access (TDMA), orthogonal frequency division multiple access (OFDMA), single carrier frequency division multiple access (SC-FDMA), etc. CDMA may be implemented by radio technology such as universal terrestrial radio access (UTRA) or CDMA2000. TDMA may be implemented by radio technology such as global system for mobile communications (GSM)/general packet radio service (GPRS)/enhanced data rates for GSM evolution (EDGE). OFDMA may be implemented by radio technology such as IEEE 802.11 (Wi-Fi), IEEE 802.16 (WiMAX), IEEE 802.20, evolved-UTRA (E-UTRA), etc. For clarity, the present disclosure focuses on 3GPP LTE and LTE-A systems. However, the technical features of the present invention are not limited thereto.

Structure of WLAN System

FIG. 1 is a diagram showing an exemplary structure of an IEEE 802.11 system to which the present invention is applicable.

The structure of the IEEE 802.11 system may include a plurality of components. A WLAN which supports transparent station (STA) mobility for a higher layer may be provided by mutual operations of the components. A basic service set (BSS) may correspond to a basic building block in an IEEE 802.11 LAN. In FIG. 1, two BSSs (BSS1 and BSS2) are present and two STAs are included in each of the BSSs (i.e. STA1 and STA2 are included in BSS1 and STA3 and STA4 are included in BSS2). An ellipse indicating the BSS in FIG. 1 may be understood as a coverage area in which STAs included in a corresponding BSS maintain communication. This area may be referred to as a basic service area (BSA). If an STA moves out of the BSA, the STA cannot directly communicate with the other STAs in the corresponding BSA.

In the IEEE 802.11 LAN, the most basic type of BSS is an independent BSS (IBSS). For example, the IBSS may have a minimum form consisting of only two STAs. The BSS (BSS1 or BSS2) of FIG. 1, which is the simplest form and does not include other components except for the STAs, may correspond to a typical example of the IBSS. This configuration is possible when STAs can directly communicate with each other. Such a type of LAN may be configured as necessary instead of being prescheduled and is also called an ad-hoc network.

Memberships of an STA in the BSS may be dynamically changed when the STA becomes an on or off state or the STA enters or leaves a region of the BSS. To become a member of the BSS, the STA may use a synchronization process to join the BSS. To access all services of a BSS infrastructure, the STA should be associated with the BSS. Such association may be dynamically configured and may include use of a distributed system service (DSS).

Figure 2:
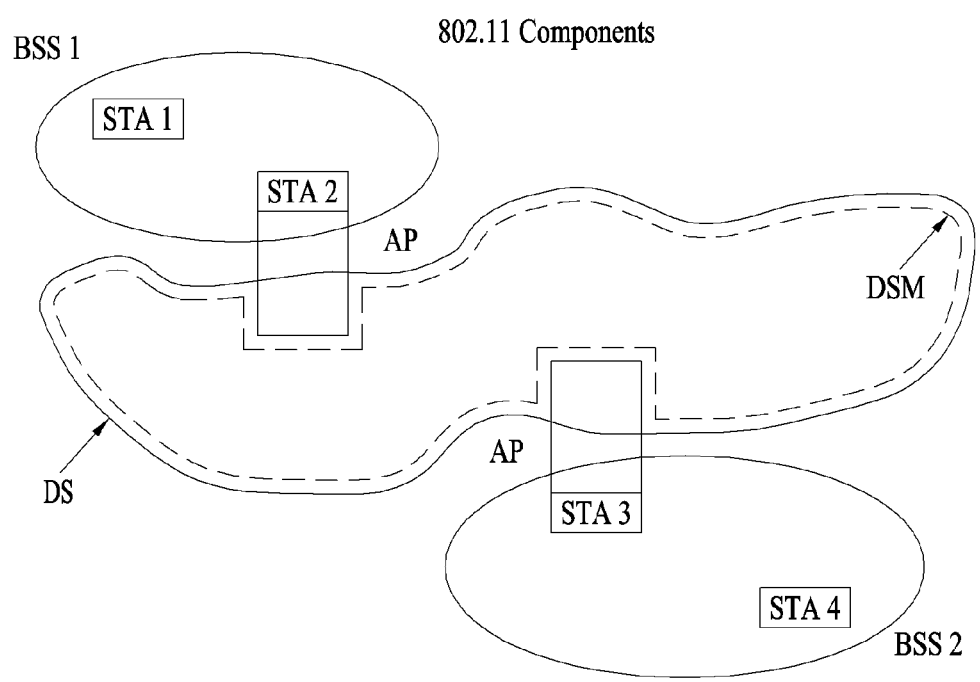
FIG. 2 is a diagram showing another exemplary structure of an IEEE 802.11 system to which the present invention is applicable.

FIG. 2 is a diagram showing another exemplary structure of an IEEE 802.11 system to which the present invention is applicable. In FIG. 2, components such as a distribution system (DS), a distribution system medium (DSM), and an access point (AP) are added to the structure of FIG. 1.

A direct STA-to-STA distance in a LAN may be restricted by physical (PHY) performance. In some cases, such restriction of the distance may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network consisting of a plurality of BSSs, instead of independent configuration as shown in FIG. 1.

The DS is a logical concept and may be specified by the characteristic of the DSM. In relation to this, a wireless medium (WM) and the DSM are logically distinguished in IEEE 802.11. Respective logical media are used for different purposes and are used by different components. In definition of IEEE 802.11, such media are not restricted to the same or different media. The flexibility of the IEEE 802.11 LAN architecture (DS architecture or other network architectures) can be explained in that a plurality of media is logically different. That is, the IEEE 802.11 LAN architecture can be variously implemented and may be independently specified by a physical characteristic of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data can be moved between the BSS and the DS through the AP. For example, STA2 and STA3 shown in FIG. 2 have STA functionality and provide a function of causing associated STAs (STA1 and STA4) to access the DS. Moreover, since all APs correspond basically to STAs, all APs are addressable entities. An address used by an AP for communication on the WM need not necessarily be identical to an address used by the AP for communication on the DSM.

Data transmitted from one of STAs associated with the AP to an STA address of the AP may be always received by an uncontrolled port and may be processed by an IEEE 802.1X port access entity. If the controlled port is authenticated, transmission data (or frame) may be transmitted to the DS.

Figure 3:
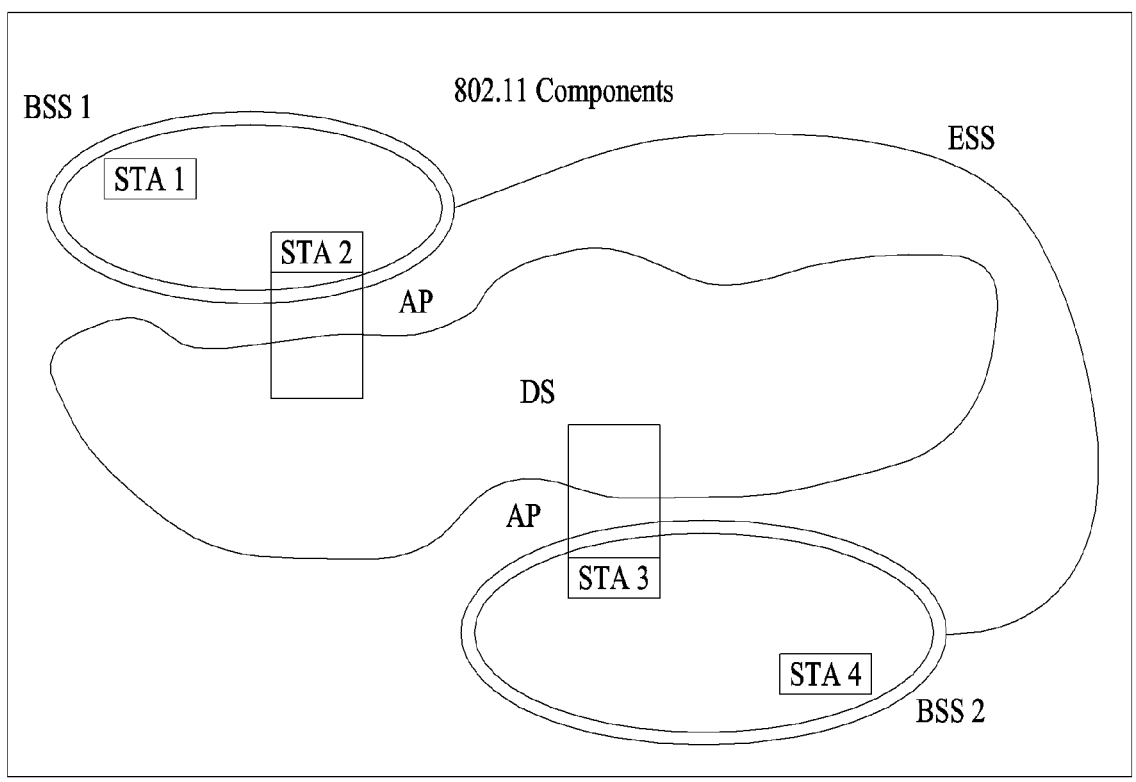
FIG. 3 is a diagram showing still another exemplary structure of an IEEE 802.11 system to which the present invention is applicable.

FIG. 3 is a diagram showing still another exemplary structure of an IEEE 802.11 system to which the present invention is applicable. In addition to the structure of FIG. 2, FIG. 3 conceptually shows an extended service set (ESS) for providing wide coverage.

A wireless network having arbitrary size and complexity may be comprised of a DS and BSSs. In the IEEE 802.11 system, such a type of network is referred to an ESS network. The ESS may correspond to a set of BSSs connected to one DS. However, the ESS does not include the DS. The ESS network is characterized in that the ESS network appears as an IBSS network in a logical link control (LLC) layer. STAs included in the ESS may communicate with each other and mobile STAs are movable transparently in LLC from one BSS to another BSS (within the same ESS).

In IEEE 802.11, relative physical locations of the BSSs in FIG. 3 are not assumed and the following forms are all possible. BSSs may partially overlap and this form is generally used to provide continuous coverage. BSSs may not be physically connected and the logical distances between BSSs have no limit. BSSs may be located at the same physical position and this form may be used to provide redundancy. One (or more than one) IBSS or ESS networks may be physically located in the same space as one (or more than one) ESS network. This may correspond to an ESS network form in the case in which an ad-hoc network operates in a location in which an ESS network is present, the case in which IEEE 802.11 networks different organizations physically overlap, or the case in which two or more different access and security policies are necessary in the same location.

Figure 4:
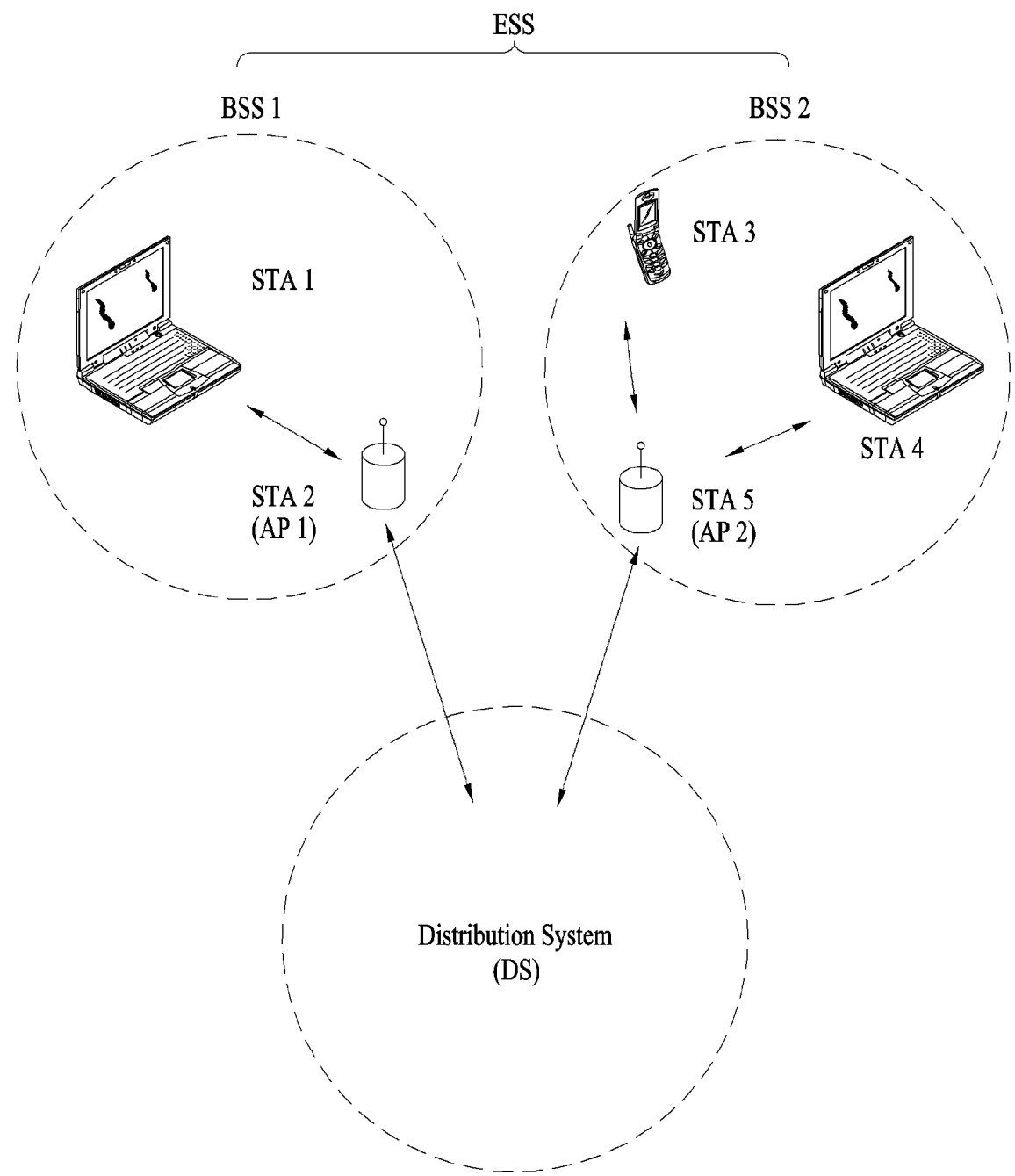
FIG. 4 is a diagram showing an exemplary structure of a WLAN system.

FIG. 4 is a diagram showing an exemplary structure of a WLAN system. In FIG. 4, an example of an infrastructure BSS including a DS is shown.

In the example of FIG. 4, BSS1 and BSS2 constitute an ESS. In the WLAN system, an STA is a device operating according to MAC/PHY regulation of IEEE 802.11. STAs include AP STAs and non-AP STAs. The non-AP STAs correspond to devices, such as mobile phones, handled directly by users. In FIG. 4, STA1, STA3, and STA4 correspond to the non-AP STAs and STA2 and STA5 correspond to AP STAs.

In the following description, the non-AP STA may be referred to as a terminal, a wireless transmit/receive unit (WTRU), a user equipment (UE), a mobile station (MS), a mobile terminal, or a mobile subscriber station (MSS). The AP is a concept corresponding to a base station (BS), a Node-B, an evolved Node-B (eNB), a base transceiver system (BTS), or a femto BS in other wireless communication fields.

Layer Structure

Operation of an STA which operates in a WLAN system will be described from the viewpoint of a layer structure. In view of the configuration of the apparatus, the layer structure may be implemented by a processor. The STA may have a plurality of layer structures. For example, the layer structure handled in the 802.11 standard may mainly include a MAC sublayer located on a data link layer (DLL) and a physical (PHY) layer. The PHY layer may include a physical layer convergence protocol (PLCP) entity, a physical medium dependent (hereinafter, referred to as PMD) entity, etc. The MAC sublayer and the PHY layer may include management entities such as a MAC sublayer management entity (MLME) and a physical layer management entity (PLME), respectively. Such entities provide layer management service interfaces for performing a layer management function.

To provide accurate MAC operation, a station management entity (SME) may be included in each STA. The SME is a layer-independent entity which exists in a separate management plane or exists off to the side. Although the exact functions of the SME are not described in detail in the present specification, the SME is responsible for collecting layer-dependent state information from various layer management entities (LMEs) and similarly setting layer-specific parameter values. The SME may perform such functions on behalf of general system management entities and implement standard management protocols.

The above-described entities may interact using various methods. For example, the entities may interact by exchanging GET/SET primitives. The primitive means a set of elements or parameters related to a specific purpose. An XX-GET.request primitive is used to request a given management information base (MIB) attribute information value. An XX-GET.confirm primitive is used to return an appropriate MIB attribute information value if the status thereof is "SUCCESS" and, otherwise, to return an error indication in a status field. An XX-SET.request primitive is used to request setting of an indicated MIB attribute value to a given value. If the MIB attribute value indicates a specific operation, execution of the specific operation is requested. An XX-SET.confirm primitive is used to confirm that the indicated MIB attribute value is set to a requested value if a status is "SUCCESS" and, otherwise, to return error conditions in a status field. If this MIB attribute value indicates a specific operation, this primitive may indicate that the specific operation has been performed.

In addition, the MLME and the SME may exchange various MLME_GET/SET primitives via an MLME_service access point (SAP). In addition, various PLME_GET/SET primitives may be exchanged between the PLME and the SME via a PLME_SAP and between the MLME and the PLME via an MLME-PLME_SAP.

Link Setup Process

Figure 5:
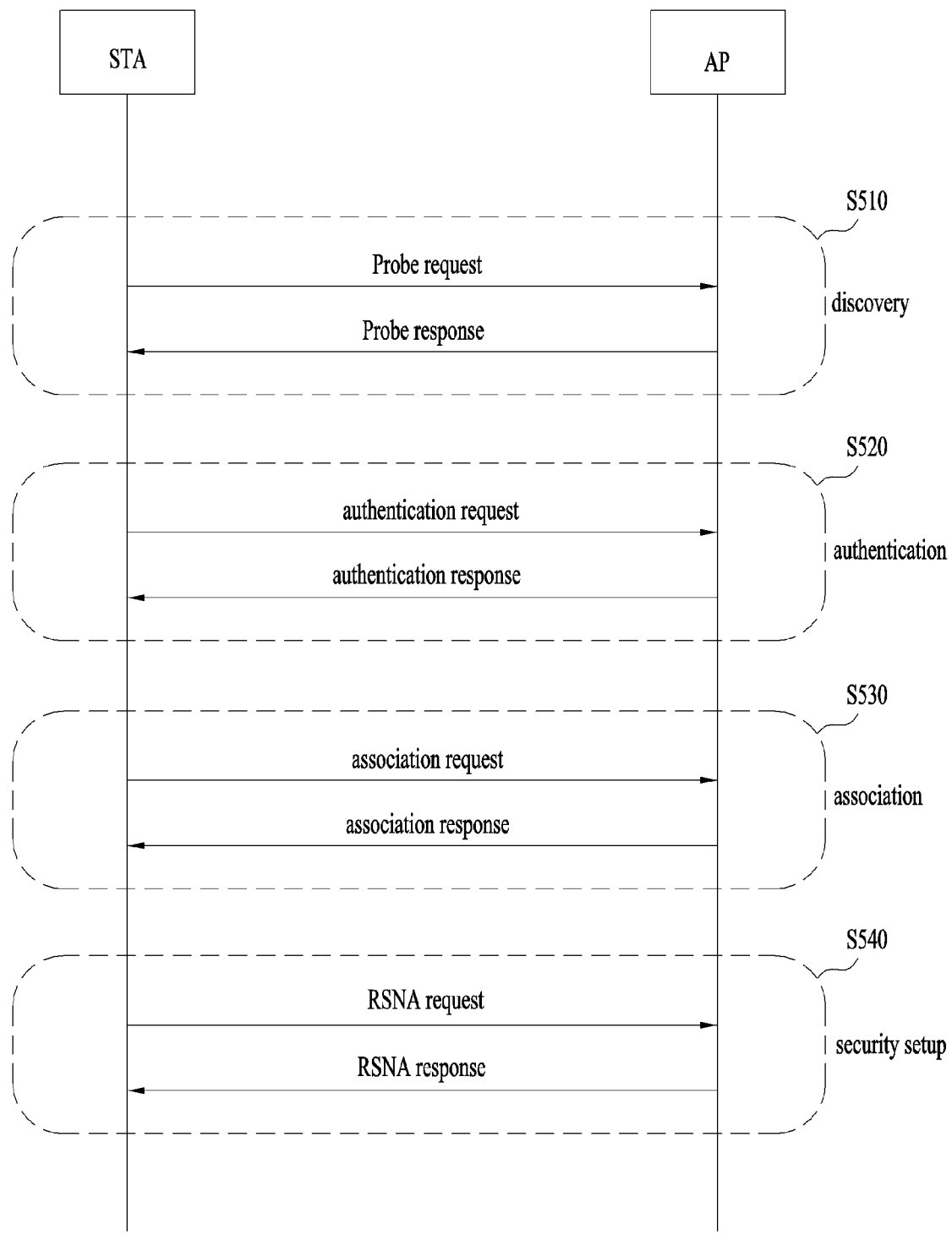
FIG. 5 is a diagram for explaining a link setup process in a WLAN system.

FIG. 5 is a diagram for explaining a general link setup process.

In order to allow an STA to establish link setup on a network and transmit/receive data over the network, the STA should perform processes of network discovery, authentication, association establishment, security setup, etc. The link setup process may also be referred to as a session initiation processor or a session setup process. In addition, discovery, authentication, association, and security setup of the link setup process may also called an association process.

An exemplary link setup process is described with reference to FIG. 5.

In step S510, an STA may perform a network discovery action. The network discovery action may include an STA scanning action. That is, in order to access the network, the STA should search for an available network. The STA needs to identify a compatible network before participating in a wireless network and the process of identifying the network present in a specific area is referred to as scanning.

Scanning is categorized into active scanning and passive scanning.

FIG. 5 exemplarily illustrates a network discovery action including an active scanning process. An STA performing active scanning transmits a probe request frame in order to determine which AP is present in a peripheral region while moving between channels and waits for a response to the probe request frame. A responder transmits a probe response frame in response to the probe request frame to the STA that has transmitted the probe request frame. Here, the responder may be an STA that has finally transmitted a beacon frame in a BSS of the scanned channel. Since an AP transmits a beacon frame in a BSS, the AP is a responder. In an IBSS, since STAs of the IBSS sequentially transmit the beacon frame, a responder is not the same. For example, an STA, that has transmitted the probe request frame at channel #1 and has received the probe response frame at channel #1, stores BSS-related information contained in the received probe response frame, and moves to the next channel (e.g. channel #2). In the same manner, the STA may perform scanning (i.e. probe request/response transmission and reception at Channel #2).

Although not shown in FIG. 5, the scanning action may also be carried out using passive scanning. An STA that performs passive scanning awaits reception of a beacon frame while moving from one channel to another channel. The beacon frame is one of management frames in IEEE 802.11. The beacon frame is periodically transmitted to indicate the presence of a wireless network and allow a scanning STA to search for the wireless network and thus join the wireless network. In a BSS, an AP is configured to periodically transmit the beacon frame and, in an IBSS, STAs in the IBSS are configured to sequentially transmit the beacon frame. Upon receipt of the beacon frame, the scanning STA stores BSS-related information contained in the beacon frame and records beacon frame information on each channel while moving to another channel. Upon receiving the beacon frame, the STA may store BSS-related information contained in the received beacon frame, move to the next channel, and perform scanning on the next channel using the same method.

Active scanning is more advantageous than passive scanning in terms of delay and power consumption.

After discovering the network, the STA may perform an authentication process in step S520. The authentication process may be referred to as a first authentication process in order to clearly distinguish this process from the security setup process of step S540.

The authentication process includes a process in which an STA transmits an authentication request frame to an AP and the AP transmits an authentication response frame to the STA in response to the authentication request frame. The authentication frame used for authentication request/response corresponds to a management frame.

The authentication frame may include information about an authentication algorithm number, an authentication transaction sequence number, a state code, a challenge text, a robust security network (RSN), a finite cyclic group (FCG), etc. The above-mentioned information contained in the authentication frame may correspond to some parts of information capable of being contained in the authentication request/response frame and may be replaced with other information or include additional information.

The STA may transmit the authentication request frame to the AP. The AP may determine whether to permit authentication for the corresponding STA based on the information contained in the received authentication request frame. The AP may provide an authentication processing result to the STA through the authentication response frame.

After the STA has been successfully authenticated, an association process may be carried out in step S530. The association process includes a process in which the STA transmits an association request frame to the AP and the AP transmits an association response frame to the STA in response to the association request frame.

For example, the association request frame may include information associated with various capabilities, a beacon listen interval, a service set identifier (SSID), supported rates, supported channels, an RSN, a mobility domain, supported operating classes, a traffic indication map (TIM) broadcast request, interworking service capability, etc.

For example, the association response frame may include information associated with various capabilities, a status code, an association ID (AID), supported rates, an enhanced distributed channel access (EDCA) parameter set, a received channel power indicator (RCPI), a received signal to noise indicator (RSNI), a mobility domain, a timeout interval (association comeback time), an overlapping BSS scan parameter, a TIM broadcast response, a quality of service (QoS) map, etc.

The above-mentioned information may correspond to some parts of information capable of being contained in the association request/response frame and may be replaced with other information or include additional information.

After the STA has been successfully associated with the network, a security setup process may be performed in step S540. The security setup process of step S540 may be referred to as an authentication process based on robust security network association (RSNA) request/response. The authentication process of step S520 may be referred to as a first authentication process and the security setup process of step S540 may also be simply referred to as an authentication process.

The security setup process of step S540 may include a private key setup process through 4-way handshaking based on, for example, an extensible authentication protocol over LAN (EAPOL) frame. In addition, the security setup process may also be performed according to other security schemes not defined in IEEE 802.11 standards.

WLAN Evolution

To overcome limitations of communication speed in a WLAN, IEEE 802.11n has recently been established as a communication standard. IEEE 802.11n aims to increase network speed and reliability and extend wireless network coverage. More specifically, IEEE 802.11n supports a high throughput (HT) of 540 Mbps or more. To minimize transmission errors and optimize data rate, IEEE 802.11n is based on MIMO using a plurality of antennas at each of a transmitter and a receiver.

With widespread supply of a WLAN and diversified applications using the WLAN, the necessity of a new WLAN system for supporting a higher processing rate than a data processing rate supported by IEEE 802.11n has recently emerged. A next-generation WLAN system supporting very high throughput (VHT) is one of IEEE 802.11 WLAN systems which have been recently proposed to support a data processing rate of 1 Gbps or more in a MAC service access point (SAP), as the next version (e.g. IEEE 802.11ac) of an IEEE 802.11n WLAN system.

To efficiently utilize a radio frequency (RF) channel, the next-generation WLAN system supports a multiuser (MU)-MIMO transmission scheme in which a plurality of STAs simultaneously accesses a channel. In accordance with the MU-MIMO transmission scheme, an AP may simultaneously transmit packets to at least one MIMO-paired STA.

In addition, support of WLAN system operations in whitespace (WS) has been discussed. For example, technology for introducing the WLAN system in TV WS such as an idle frequency band (e.g. 54 to 698 MHz band) due to transition to digital TVs from analog TVs has been discussed under the IEEE 802.11af standard. However, this is for illustrative purposes only, and the WS may be a licensed band capable of being primarily used only by a licensed user. The licensed user is a user who has authority to use the licensed band and may also be referred to as a licensed device, a primary user, an incumbent user, etc.

For example, an AP and/or STA operating in WS should provide a function for protecting the licensed user. As an example, assuming that the licensed user such as a microphone has already used a specific WS channel which is a frequency band divided by regulations so as to include a specific bandwidth in the WS band, the AP and/or STA cannot use the frequency band corresponding to the corresponding WS channel in order to protect the licensed user. In addition, the AP and/or STA should stop using the corresponding frequency band under the condition that the licensed user uses a frequency band used for transmission and/or reception of a current frame.

Therefore, the AP and/or STA needs to determine whether a specific frequency band of a WS band can be used, in other words, whether a licensed user is present in the frequency band. A scheme for determining whether a licensed user is present in a specific frequency band is referred to as spectrum sensing. An energy detection scheme, a signature detection scheme, etc. are used as the spectrum sensing mechanism. The AP and/or STA may determine that the frequency band is being used by a licensed user if the intensity of a received signal exceeds a predetermined value or if a DTV preamble is detected.

Machine-to-machine (M2M) communication technology has been discussed as next generation communication technology. Technical standard for supporting M2M communication has been developed as IEEE 802.11ah in an IEEE 802.11 WLAN system. M2M communication refers to a communication scheme including one or more machines or may also be called machine type communication (MTC) or machine-to-machine communication. In this case, the machine refers to an entity that does not require direct manipulation or intervention of a user. For example, not only a meter or vending machine including a radio communication module but also a user equipment (UE) such as a smartphone capable of performing communication by automatically accessing a network without user manipulation/intervention may be machines. M2M communication may include device-to-device (D2D) communication and communication between a device and an application server. As exemplary communication between a device and an application server, communication between a vending machine and an application server, communication between a point of sale (POS) device and an application server, and communication between an electric meter, a gas meter, or a water meter and an application server. M2M communication-based applications may include security, transportation, healthcare, etc. In the case of considering the above-mentioned application examples, M2M communication has to support occasional transmission/reception of a small amount of data at low speed under an environment including a large number of devices.

More specifically, M2M communication should support a large number of STAs. Although a currently defined WLAN system assumes that one AP is associated with a maximum of 2007 STAs, methods for supporting other cases in which more STAs (e.g. about 6000 STAs) than 2007 STAs are associated with one AP have been discussed in M2M communication. In addition, it is expected that many applications for supporting/requesting a low transfer rate are present in M2M communication. In order to smoothly support these requirements, an STA in the WLAN system may recognize the presence or absence of data to be transmitted thereto based on a TIM element and methods for reducing the bitmap size of the TIM have been discussed. In addition, it is expected that much traffic having a very long transmission/reception interval is present in M2M communication. For example, a very small amount of data such as electric/gas/water metering needs to be transmitted and received at long intervals (e.g. every month). Accordingly, although the number of STAs associated with one AP increases in the WLAN system, methods for efficiently supporting the case in which there are a very small number of STAs each including a data frame to be received from the AP during one beacon period has been discussed.

As described above, WLAN technology is rapidly developing and not only the above-mentioned exemplary technologies but also other technologies including direct link setup, improvement of media streaming throughput, support of high-speed and/or large-scale initial session setup, and support of extended bandwidth and operating frequency are being developed.

Medium Access Mechanism

In a WLAN system based on IEEE 802.11, a basic access mechanism of medium access control (MAC) is a carrier sense multiple access with collision avoidance (CSMA/CA) mechanism. The CSMA/CA mechanism is also referred to as a distributed coordination function (DCF) of the IEEE 802.11 MAC and basically adopts a "listen before talk" access mechanism. In this type of access mechanism, an AP and/or an STA may sense a wireless channel or a medium during a predetermined time duration (e.g. DCF interframe space (DIFS) before starting transmission. As a result of sensing, if it is determined that the medium is in an idle status, the AP and/or the STA starts frame transmission using the medium. Meanwhile, if it is sensed that the medium is in an occupied state, the AP and/or the STA does not start its transmission and may attempt to perform frame transmission after setting and waiting for a delay duration (e.g. a random backoff period) for medium access. Since it is expected that multiple STAs attempt to perform frame transmission after waiting for different time durations by applying the random backoff period, collision can be minimized.

An IEEE 802.11 MAC protocol provides a hybrid coordination function (HCF) based on the DCF and a point coordination function (PCF). The PCF refers to a scheme of performing periodic polling by using a polling-based synchronous access method so that all reception APs and/or STAs can receive a data frame. The HCF includes enhanced distributed channel access (EDCA) and HCF controlled channel access (HCCA). EDCA is a contention based access scheme used by a provider to provide a data frame to a plurality of users. HCCA uses a contention-free based channel access scheme employing a polling mechanism. The HCF includes a medium access mechanism for improving QoS of a WLAN and QoS data may be transmitted in both a contention period (CP) and a contention-free period (CFP).

Figure 6:
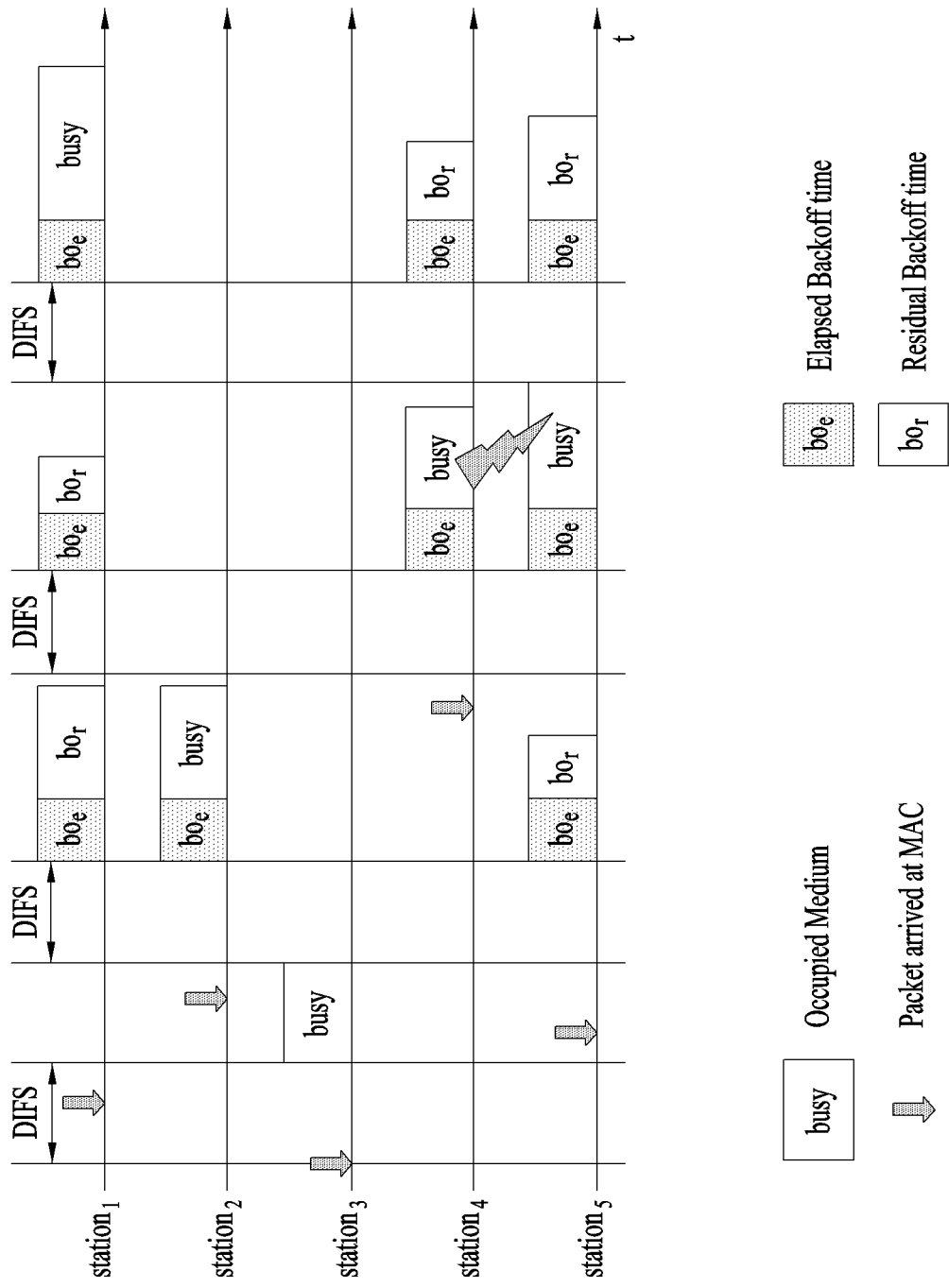
FIG. 6 is a diagram for explaining a backoff process.

FIG. 6 is a diagram for explaining a backoff process.

Operations based on a random backoff period will now be described with reference to FIG. 6. If a medium of an occupy or busy state transitions to an idle state, several STAs may attempt to transmit data (or frames). As a method for minimizing collision, each STA may select a random backoff count, wait for a slot time corresponding to the selected backoff count, and then attempt to start data or frame transmission. The random backoff count may be a pseudo-random integer and may be set to one of 0 to CW values. In this case, CW is a contention window parameter value. Although CWmin is given as an initial value of the CW parameter, the initial value may be doubled in case of transmission failure (e.g. in the case in which ACK for the transmission frame is not received). If the CW parameter value reaches CWmax, the STAs may attempt to perform data transmission while CWmax is maintained until data transmission is successful. If data has been successfully transmitted, the CW parameter value is reset to CWmin. Desirably, CW, CWmin, and CWmax are set to $2^n-1$ (where n=0, 1, 2, . . . ).

If the random backoff process is started, the STA continuously monitors the medium while counting down backoff slot in response to the determined backoff count value. If the medium is monitored as the occupied state, the countdown stops and waits for a predetermined time. If the medium is in the idle status, the remaining countdown restarts.

As shown in the example of FIG. 6, if a packet to be transmitted to MAC of STA3 arrives at STA3, STA3 may confirm that the medium is in the idle state during a DIFS and directly start frame transmission. In the meantime, the remaining STAs monitor whether the medium is in the busy state and wait for a predetermined time. During the predetermined time, data to be transmitted may occur in each of STA1, STA2, and STA5. If it is monitored that the medium is in the idle state, each STA waits for the DIFS time and then may perform countdown of the backoff slot in response to a random backoff count value selected by each STA. The example of FIG. 6 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupation of STA2 is finished and the medium re-enters the idle state, each of STA1 and STA5 waits for a predetermined time DIFS and restarts backoff counting. That is, after counting down the remaining backoff time corresponding to the residual backoff time, each of STA1 and STA5 may start frame transmission. Since the residual backoff time of STA5 is shorter than that of STA1, STA5 starts frame transmission. Meanwhile, data to be transmitted may occur even in STA4 while STA2 occupies the medium. In this case, if the medium is in the idle state, STA4 may wait for the DIFS time, perform countdown in response to the random backoff count value selected thereby, and then start frame transmission. FIG. 6 exemplarily shows the case in which the residual backoff time of STA5 is identical to the random backoff count value of STA4 by chance. In this case, collision may occur between STA4 and STA5. Then, each of STA4 and STA5 does not receive ACK, resulting in occurrence of data transmission failure. In this case, each of STA4 and STA5 may increase the CW value by two times, select a random backoff count value, and then perform countdown. Meanwhile, STA1 waits for a predetermined time while the medium is in the occupied state due to transmission of STA4 and STA5. If the medium is in the idle state, STA1 may wait for the DIFS time and then start frame transmission after lapse of the residual backoff time.

STA Sensing Operation

As described above, the CSMA/CA mechanism includes not only a physical carrier sensing mechanism in which the AP and/or an STA directly senses a medium but also a virtual carrier sensing mechanism. The virtual carrier sensing mechanism can solve some problems such as a hidden node problem encountered in medium access. For virtual carrier sensing, MAC of the WLAN system may use a network allocation vector (NAV). The NAV is a value used to indicate a time remaining until an AP and/or an STA which is currently using the medium or has authority to use the medium enters an available state to another AP and/or STA. Accordingly, a value set to the NAV corresponds to a reserved time in which the medium will be used by an AP and/or STA configured to transmit a corresponding frame. An STA receiving the NAV value is not allowed to perform medium access during the corresponding reserved time. For example, NAV may be set according to the value of a 'duration' field of a MAC header of a frame.

A robust collision detection mechanism has been proposed to reduce the probability of collision. This will be described with reference to FIGS. 7 and 8. Although an actual carrier sensing range is different from a transmission range, it is assumed that the actual carrier sensing range is identical to the transmission range for convenience of description.

Figure 7:
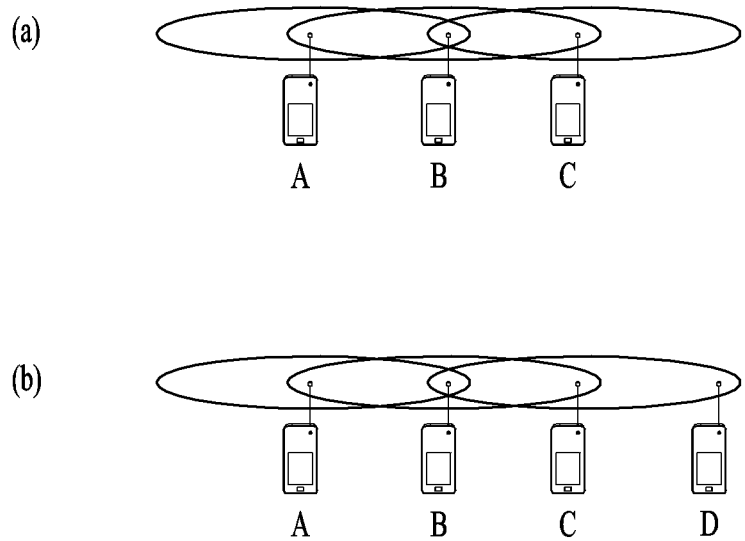
FIG. 7 is a diagram for explaining a hidden node and an exposed node.

FIG. 7 is a diagram for explaining a hidden node and an exposed node.

FIG. 7(*a*) exemplarily shows a hidden node. In FIG. 7(*a*), STA A communicates with STA B, and STA C has information to be transmitted. Specifically, STA C may determine that a medium is in an idle state when performing carrier sensing before transmitting data to STA B, although STA A is transmitting information to STA B. This is because transmission of STA A (i.e. occupation of the medium) may not be detected at the location of STA C. In this case, STA B simultaneously receives information of STA A and information of STA C, resulting in occurrence of collision. Here, STA A may be considered a hidden node of STA C.

FIG. 7(*b*) exemplarily shows an exposed node. In FIG. 7(*b*), in a situation in which STA B transmits data to STA A, STA C has information to be transmitted to STA D. If STA C performs carrier sensing, it is determined that a medium is occupied due to transmission of STA B. Therefore, although STA C has information to be transmitted to STA D, since the medium-occupied state is sensed, STA C should wait for a predetermined time until the medium is in the idle state. However, since STA A is actually located out of the transmission range of STA C, transmission from STA C may not collide with transmission from STA B from the viewpoint of STA A, so that STA C unnecessarily enters a standby state until STA B stops transmission. Here, STA C is referred to as an exposed node of STA B.

Figure 8:
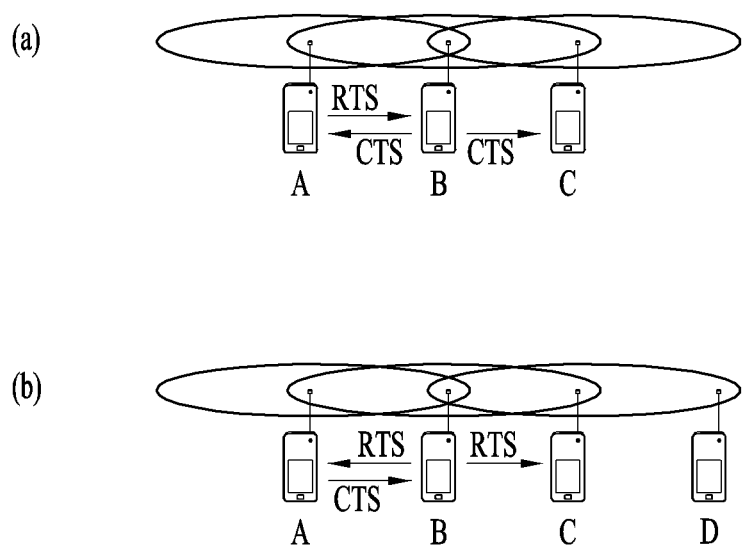
FIG. 8 is a diagram for explaining request to send (RTS) and clear to send (CTS).

FIG. 8 is a diagram for explaining request to send (RTS) and clear to send (CTS).

To efficiently utilize a collision avoidance mechanism under the above-mentioned situation of FIG. 7, it is possible to use a short signaling packet such as RTS and CTS. RTS/CTS between two STAs may be overheard by peripheral STA(s), so that the peripheral STA(s) may consider whether information is transmitted between the two STAs. For example, if an STA to be used for data transmission transmits an RTS frame to an STA receiving data, the STA receiving data may inform peripheral STAs that itself will receive data by transmitting a CTS frame to the peripheral STAs.

FIG. 8(*a*) exemplarily shows a method for solving problems of a hidden node. In FIG. 8(*a*), it is assumed that both STA A and STA C are ready to transmit data to STA B. If STA A transmits RTS to STA B, STA B transmits CTS to each of STA A and STA C located in the vicinity of the STA B. As a result, STA C waits for a predetermined time until STA A and STA B stop data transmission, thereby avoiding collision.

FIG. 8(*b*) exemplarily shows a method for solving problems of an exposed node. STA C performs overhearing of RTS/CTS transmission between STA A and STA B, so that STA C may determine that no collision will occur although STA C transmits data to another STA (e.g. STA D). That is, STA B transmits RTS to all peripheral STAs and only STA A having data to be actually transmitted may transmit CTS. STA C receives only the RTS and does not receive the CTS of STA A, so that it can be recognized that STA A is located outside of the carrier sensing range of STA C.

Power Management

As described above, the WLAN system needs to perform channel sensing before an STA performs data transmission/reception. The operation of always sensing the channel causes persistent power consumption of the STA. Power consumption in a reception state is not greatly different from that in a transmission state. Continuous maintenance of the reception state may cause large load to a power-limited STA (i.e. an STA operated by a battery). Therefore, if an STA maintains a reception standby mode so as to persistently sense a channel, power is inefficiently consumed without special advantages in terms of WLAN throughput. In order to solve the above-mentioned problem, the WLAN system supports a power management (PM) mode of the STA.

The PM mode of the STA is classified into an active mode and a power save (PS) mode. The STA basically operates in the active mode. The STA operating in the active mode maintains an awake state. In the awake state, the STA may perform a normal operation such as frame transmission/reception or channel scanning. On the other hand, the STA operating in the PS mode is configured to switch between a sleep state and an awake state. In the sleep state, the STA operates with minimum power and performs neither frame transmission/reception nor channel scanning.

Since power consumption is reduced in proportion to a specific time in which the STA stays in the sleep state, an operation time of the STA is increased. However, it is impossible to transmit or receive a frame in the sleep state so that the STA cannot always operate for a long period of time. If there is a frame to be transmitted to an AP, the STA operating in the sleep state is switched to the awake state to transmit/receive the frame. On the other hand, if the AP has a frame to be transmitted to the STA, the sleep-state STA is unable to receive the frame and cannot recognize the presence of a frame to be received. Accordingly, the STA may need to switch to the awake state according to a specific period in order to recognize the presence or absence of a frame to be transmitted thereto (or in order to receive the frame if the AP has the frame to be transmitted thereto).

Figure 9:
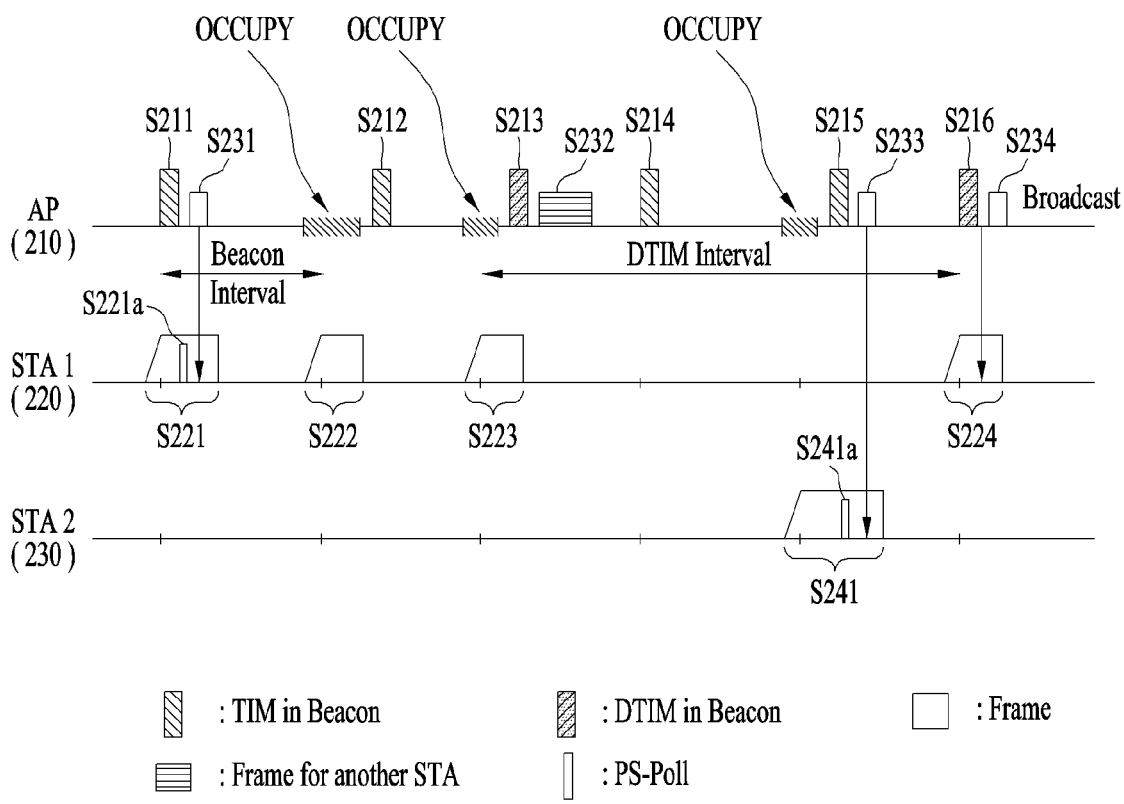
FIG. 9 is a diagram for explaining a PM operation.

FIG. 9 is a diagram for explaining a PM operation.

Referring to FIG. 9, an AP 210 transmits a beacon frame to STAs present in a BSS at intervals of a predetermined time period (S211, S212, S213, S214, S215, and S216). The beacon frame includes a TIM information element. The TIM information element includes buffered traffic regarding STAs associated with the AP 210 and includes information indicating that a frame is to be transmitted. The TIM information element includes a TIM for indicating a unicast frame and a delivery traffic indication map (DTIM) for indicating a multicast or broadcast frame.

The AP 210 may transmit a DTIM once whenever the beacon frame is transmitted three times. Each of STA1 220 and STA2 222 operate in a PS mode. Each of STA1 220 and STA2 222 is switched from a sleep state to an awake state every wakeup interval of a predetermined period such that STA1 220 and STA2 222 may be configured to receive the TIM information element transmitted by the AP 210. Each STA may calculate a switching start time at which each STA may start switching to the awake state based on its own local clock. In FIG. 9, it is assumed that a clock of the STA is identical to a clock of the AP.

For example, the predetermined wakeup interval may be configured in such a manner that STA1 220 can switch to the awake state to receive the TIM element every beacon interval. Accordingly, STA1 220 may switch to the awake state when the AP 210 first transmits the beacon frame (S211). STA1 220 may receive the beacon frame and obtain the TIM information element. If the obtained TIM element indicates the presence of a frame to be transmitted to STA1 220, STA1 220 may transmit a power save-Poll (PS-Poll) frame, which requests the AP 210 to transmit the frame, to the AP 210 (S221a). The AP 210 may transmit the frame to STA1 220 in response to the PS-Poll frame (S231). STA1 220 which has received the frame is re-switched to the sleep state and operates in the sleep state.

When the AP 210 secondly transmits the beacon frame, since a busy medium state in which the medium is accessed by another device is obtained, the AP 210 may not transmit the beacon frame at an accurate beacon interval and may transmit the beacon frame at a delayed time (S212). In this case, although STA1 220 is switched to the awake state in response to the beacon interval, STA1 does not receive the delay-transmitted beacon frame so that it re-enters the sleep state (S222).

When the AP 210 thirdly transmits the beacon frame, the corresponding beacon frame may include a TIM element configured as a DTIM. However, since the busy medium state is given, the AP 210 transmits the beacon frame at a delayed time (S213). STA1 220 is switched to the awake state in response to the beacon interval and may obtain a DTIM through the beacon frame transmitted by the AP 210. It is assumed that the DTIM obtained by STA1 220 does not have a frame to be transmitted to STA1 220 and there is a frame for another STA. In this case, STA1 220 may confirm the absence of a frame to be received in the STA1 220 and re-enters the sleep state so that the STA1 220 may operate in the sleep state. After transmitting the beacon frame, the AP 210 transmits the frame to the corresponding STA (S232).

The AP 210 fourthly transmits the beacon frame (S214). However, since it was impossible for STA1 220 to obtain information regarding the presence of buffered traffic associated therewith through previous double reception of a TIM element, STA1 220 may adjust the wakeup interval for receiving the TIM element. Alternatively, provided that signaling information for coordination of the wakeup interval value of STA1 220 is contained in the beacon frame transmitted by the AP 210, the wakeup interval value of the STA1 220 may be adjusted. In this example, STA1 220, which has been switched to receive a TIM element every beacon interval, may be configured to be switched to another operation state in which STA1 220 awakes from the sleep state once every three beacon intervals. Therefore, when the AP 210 transmits a fourth beacon frame (S214) and transmits a fifth beacon frame (S215), STA1 220 maintains the sleep state such that it cannot obtain the corresponding TIM element.

When the AP 210 sixthly transmits the beacon frame (S216), STA1 220 is switched to the awake state and operates in the awake state, so that the STA1 220 may obtain the TIM element contained in the beacon frame (S224). The TIM element is a DTIM indicating the presence of a broadcast frame. Accordingly, STA1 220 does not transmit the PS-Poll frame to the AP 210 and may receive the broadcast frame transmitted by the AP 210 (S234). In the meantime, the wakeup interval configured for STA2 230 may be longer than the wakeup interval of STA1 220. Accordingly, STA2 230 may enter the awake state at a specific time (S215) where the AP 210 fifthly transmits the beacon frame and receives the TIM element (S241). STA2 230 may recognize the presence of a frame to be transmitted thereto through the TIM element and transmit the PS-Poll frame to the AP 210 to request frame transmission (S241a). The AP 210 may transmit the frame to STA2 230 in response to the PS-Poll frame (S233).

In order to manage a PS mode shown in FIG. 9, the TIM element may include either a TIM indicating the presence or absence of a frame to be transmitted to the STA or include a DTIM indicating the presence or absence of a broadcast/multicast frame. The DTIM may be implemented through field setting of the TIM element.

Figure 10:
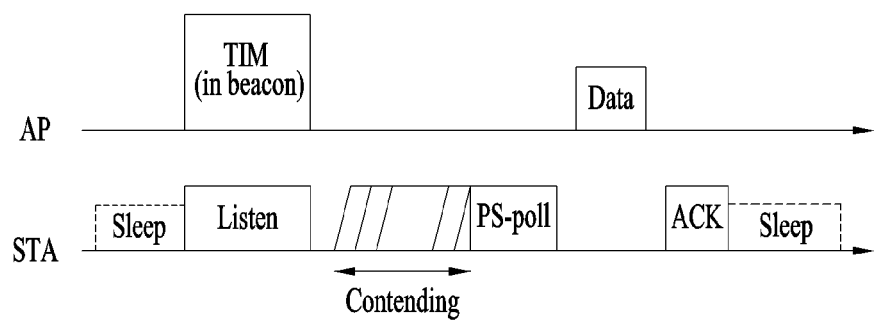
FIGS. 10 to 12 are diagrams for explaining detailed operations of an STA that has received a TIM.
Figure 11:
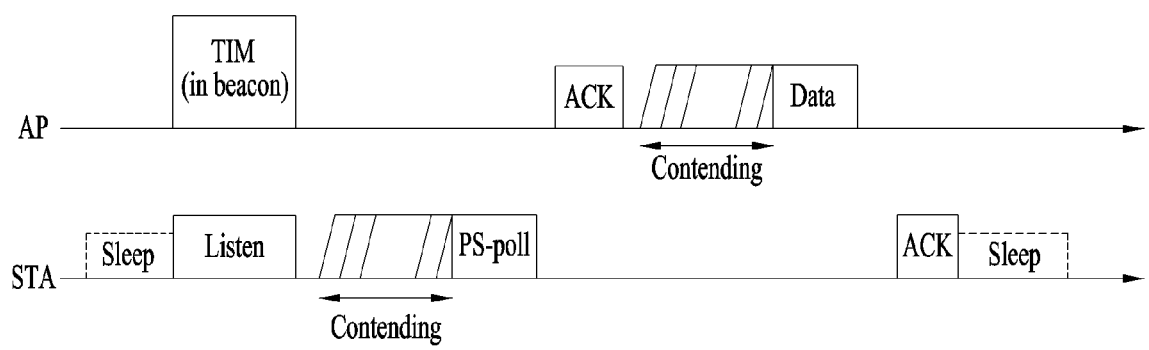
Figure 12:
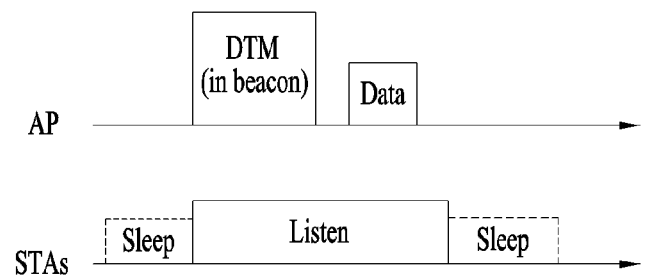

FIGS. 10 to 12 are diagrams for explaining detailed operations of an STA that has received a TIM.

Referring to FIG. 10, an STA is switched from a sleep state to an awake state so as to receive a beacon frame including a TIM from an AP. The STA may recognize the presence of buffered traffic to be transmitted thereto by interpreting the received TIM element. After contending with other STAs to access a medium for PS-Poll frame transmission, the STA may transmit the PS-Poll frame for requesting data frame transmission to the AP. Upon receiving the PS-Poll frame transmitted by the STA, the AP may transmit the frame to the STA. The STA may receive a data frame and then transmit an ACK frame to the AP in response to the received data frame. Thereafter, the STA may re-enter the sleep state.

As illustrated in FIG. 10, the AP may operate according to an immediate response scheme in which the AP receives the PS-Poll frame from the STA and transmits the data frame after a predetermined time (e.g. a short interframe space (SIFS)). Meanwhile, if the AP does not prepare a data frame to be transmitted to the STA during the SIFS time after receiving the PS-Poll frame, the AP may operate according to a deferred response scheme and this will be described with reference to FIG. 11.

The STA operations of FIG. 11 in which an STA is switched from a sleep state to an awake state, receives a TIM from an AP, and transmits a PS-Poll frame to the AP through contention are identical to those of FIG. 10. Even upon receiving the PS-Poll frame, if the AP does not prepare a data frame during an SIFS time, the AP may transmit an ACK frame to the STA instead of transmitting the data frame. If the data frame is prepared after transmission of the ACK frame, the AP may transmit the data frame to the STA after completion of contention. The STA may transmit the ACK frame indicating that the data frame has successfully been received to the AP and transition to the sleep state.

FIG. 12 illustrates an exemplary case in which an AP transmits a DTIM. STAs may be switched from the sleep state to the awake state so as to receive a beacon frame including a DTIM element from the AP. The STAs may recognize that a multicast/broadcast frame will be transmitted through the received DTIM. After transmission of the beacon frame including the DTIM, the AP may directly transmit data (i.e. the multicast/broadcast frame) without transmitting/receiving a PS-Poll frame. While the STAs continuously maintains the awake state after reception of the beacon frame including the DTIM, the STAs may receive data and then switch to the sleep state after completion of data reception.

TIM Structure

In the operation and management method of the PS mode based on the TIM (or DTIM) protocol described with reference to FIGS. 9 to 12, STAs may determine whether a data frame to be transmitted for the STAs through STA identification information contained in a TIM element. The STA identification information may be information associated with an AID to be allocated when an STA is associated with an AP.

The AID is used as a unique ID of each STA within one BSS. For example, the AID for use in the current WLAN system may be allocated as one of 1 to 2007. In the currently defined WLAN system, 14 bits for the AID may be allocated to a frame transmitted by an AP and/or an STA. Although the AID value may be assigned up to 16383, the values of 2008 to 16383 are set to reserved values.

A TIM element according to legacy definition is inappropriate to apply an M2M application through which many STAs (for example, more than 2007 STAs) are associated with one AP. If a conventional TIM structure is extended without any change, since the TIM bitmap size excessively increases, it is impossible to support the extended TIM structure using a legacy frame format and the extended TIM structure is inappropriate for M2M communication in which application of a low transfer rate is considered. In addition, it is expected that there are a very small number of STAs each having a reception data frame during one beacon period. Therefore, according to exemplary application of the above-mentioned M2M communication, since it is expected that most bits are set to zero (0) although the TIM bitmap size is increased, technology capable of efficiently compressing a bitmap is needed.

In legacy bitmap compression technology, successive values of 0 are omitted from a front part of a bitmap and the omitted result may be defined as an offset (or start point) value. However, although STAs each including a buffered frame is small in number, if there is a high difference between AID values of respective STAs, compression efficiency is not high. For example, assuming that only a frame to be transmitted to two STAs having AID values of 10 and 2000 is buffered, the length of a compressed bitmap is set to 1990 but the remaining parts other than both end parts are assigned zero. If fewer STAs are associated with one AP, inefficiency of bitmap compression does not cause serious problems. However, if the number of STAs associated with one AP increases, such inefficiency may deteriorate overall system performance.

Figure 13:
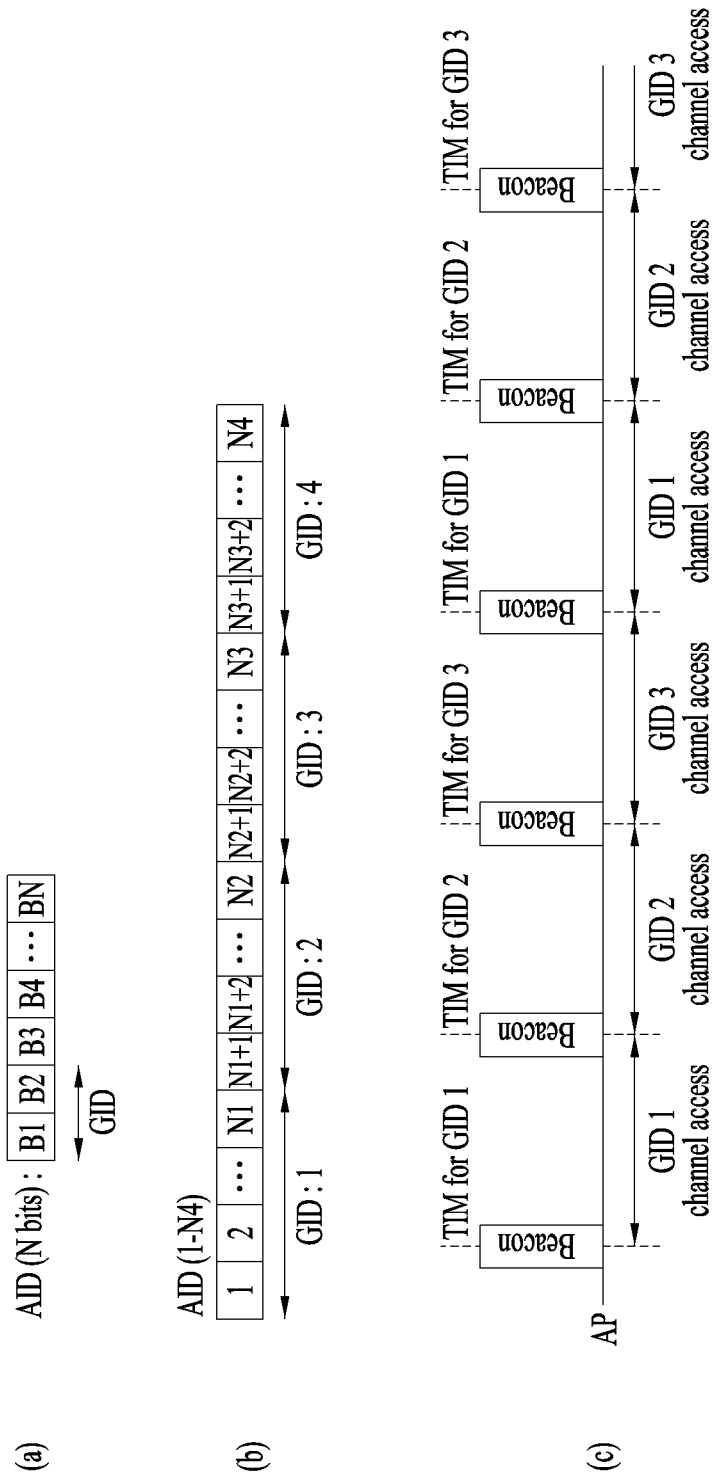
FIG. 13 is a diagram illustrating an exemplary group-based AID.

In order to solve the above-mentioned problems, AIDs are divided into a plurality of groups such that data can be more efficiently transmitted. A designated group ID (GID) is allocated to each group. AIDs allocated on a group basis will be described with reference to FIG. 13.

FIG. 13(a) is a diagram illustrating an exemplary group-based AID. In FIG. 13(a), a few bits located at the front part of an AID bitmap may be used to indicate a GID. For example, it is possible to designate four GIDs using the first two bits of an AID bitmap. If a total length of the AID bitmap is N bits, the first two bits (B1 and B2) may represent a GID of the corresponding AID.

FIG. 13(a) is a diagram illustrating another exemplary group-based AID. In FIG. 13(b), a GID may be allocated according to the position of the AID. In this case, AIDs having the same GID may be represented by offset and length values. For example, if GID 1 is denoted by offset A and length B, this means that AIDs of A to A+B−1 on a bitmap have GID 1. For example, FIG. 13(b) assumes that AIDs of 1 to N4 are divided into four groups. In this case, AIDs contained in GID 1 are denoted by 1 to N1 and the AIDs contained in this group may be represented by offset 1 and length N1. Next, AIDs contained in GID 2 may be represented by offset N1+1 and length N2−N1+1, AIDs contained in GID 3 may be represented by offset N2+1 and length N3−N2+1, and AIDs contained in GID 4 may be represented by offset N3+1 and length N4−N3+1.

If the aforementioned group-based AIDs are introduced, channel access may be allowed in a different time interval according to GIDs, so that the problem caused by the insufficient number of TIM elements with respect to a large number of STAs can be solved and at the same time data can be efficiently transmitted/received. For example, during a specific time interval, channel access is allowed only for STA(s) corresponding to a specific group and channel access to the remaining STA(s) may be restricted. A predetermined time interval in which access to only specific STA(s) is allowed may also be referred to as a restricted access window (RAW).

Channel access based on GID will now be described with reference to FIG. 13(c). FIG. 13(c) exemplarily illustrates a channel access mechanism according to a beacon interval when AIDs are divided into three groups. A first beacon interval (or a first RAW) is a specific interval in which channel access to STAs corresponding to AIDs contained in GID 1 is allowed and channel access of STAs contained in other GIDs is disallowed. To implement this, a TIM element used only for AIDs corresponding to GID 1 is contained in a first beacon. A TIM element used only for AIDs corresponding to GID 2 is contained in a second beacon frame. Accordingly, only channel access to STAs corresponding to the AIDs contained in GID 2 is allowed during a second beacon interval (or a second RAW). A TIM element used only for AIDs having GID 3 is contained in a third beacon frame, so that channel access to STAs corresponding to the AIDs contained in GID 3 is allowed during a third beacon interval (or a third RAW). A TIM element used only for AIDs having GID 1 is contained in a fourth beacon frame, so that channel access to STAs corresponding to the AIDs contained in GID 1 is allowed during a fourth beacon interval (or a fourth RAW). Thereafter, only channel access to STAs belonging to a specific group indicated by a TIM contained in a corresponding beacon frame may be allowed in each of beacon intervals subsequent to the fifth beacon interval (or in each of RAWs subsequent to the fifth RAW).

Although FIG. 13(c) exemplarily shows that the order of allowed GIDs is cyclical or periodic according to the beacon interval, the scope of the present invention is not limited thereto. That is, only AID(s) contained in specific GID(s) may be contained in a TIM element, so that channel access only to STA(s) corresponding to the specific AID(s) is allowed during a specific time interval (e.g. a specific RAW) and channel access to the remaining STA(s) is disallowed.

The aforementioned group-based AID allocation scheme may also be referred to as a hierarchical structure of a TIM. That is, a total AID space is divided into a plurality of blocks and channel access to STA(s) (i.e. STA(s) of a specific group) corresponding to a specific block having any one of values other than '0' may be allowed. Therefore, since a large-sized TIM is divided into small-sized blocks/groups, an STA can easily maintain TIM information and blocks/groups may be easily managed according to class, QoS or usage of the STA. Although FIG. 13 exemplarily shows a 2-level layer, a hierarchical TIM structure comprised of two or more levels may be configured. For example, a total AID space may be divided into a plurality of page groups, each page group may be divided into a plurality of blocks, and each block may be divided into a plurality of sub-blocks. In this case, according to the extended version of FIG. 13(a), first N1 bits of an AID bitmap may represent a page ID (i.e. PID), the next N2 bits may represent a block ID, the next N3 bits may represent a sub-block ID, and the remaining bits may represent the position of STA bits contained in a sub-block.

In the embodiments of the present invention described below, various schemes for dividing STAs (or AIDs allocated to the STAs respectively) into predetermined hierarchical group units and managing the same may be used, but the group-based AID allocation schemes are not limited to these embodiments.

Frame Structure

Figure 14:
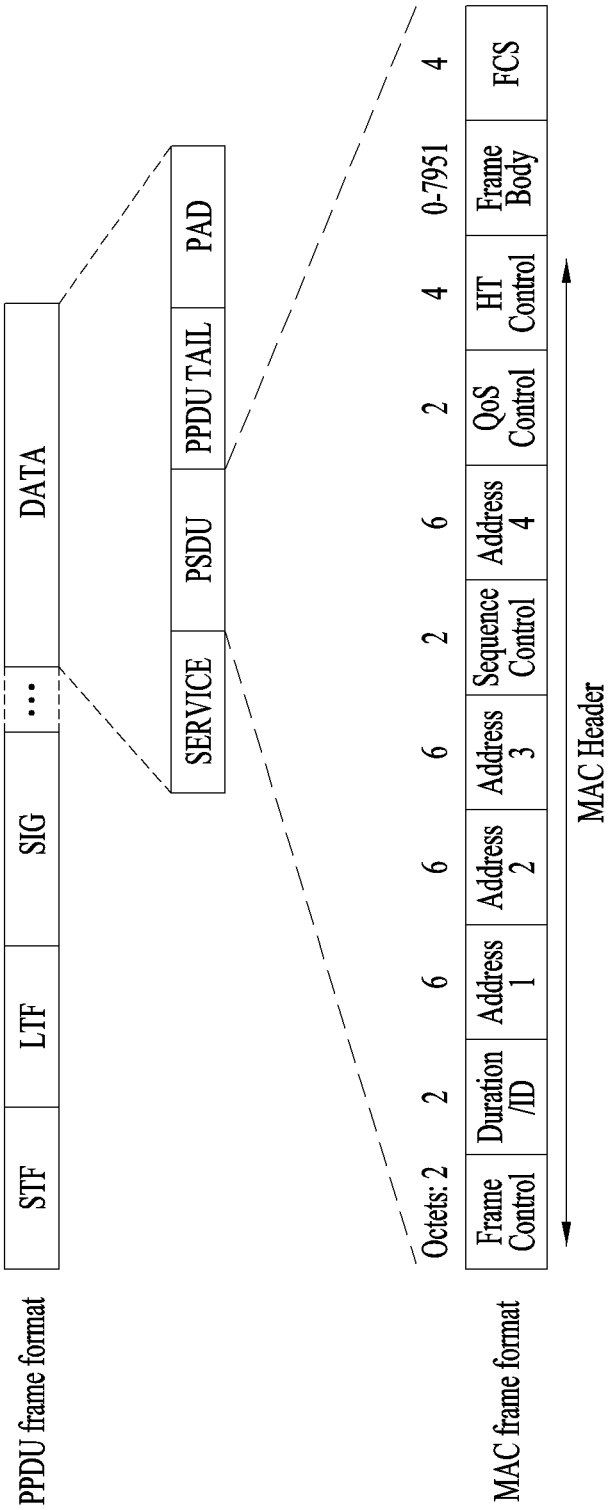
FIG. 14 is a diagram illustrating an example of a frame structure used in an IEEE 802.11 system.

FIG. 14 is a diagram showing an example of a frame structure used in an IEEE 802.11 system.

A physical layer convergence protocol (PLCP) packet data unit (PPDU) frame format may include a short training field (STF), a long training field (LTF), a signal (SIG) field and a data field. A most basic (e.g., non-high throughput (HT)) PPDU frame format may include a legacy-STF (L-STF), a legacy-LTF (L-LTF), an SIG field and a data field. In addition, additional (different types of) STFs, LTFs and SIG fields may be included between the SIG field and the data field according to the type of the PPDU frame format (e.g., a HT-mixed format PPDU, a HT-Greefield format PPDU, a very high throughput (VHT) PPDU, etc.).

The STF is a signal for signal detection, automatic gain control (AGC), diversity selection, accurate time synchronization, etc. and the LTF is a signal for channel estimation, frequency error estimation, etc. A combination of the STF and the LTF may be referred to as a PLCP preamble and the PLCP preamble may refer to a signal for synchronization and channel estimation of an OFDM physical layer.

The SIG field may include a RATE field and a LENGTH field. The RATE field may include information about modulation and coding rate of data. The LENGTH field may include information about the length of data. Additionally, the SIG field may include a parity bit, an SIG TAIL bit, etc.

The data field may include a SERVICE field, a PLCP service data unit (PSDU) and a PPDU Tail bit and further may include a padding bit if necessary. Some bits of the SERVICE field may be used for synchronization of a descrambler in a receiver. The PSDU corresponds to an MAC protocol data unit (PDU) defined at an MAC layer and may include data created/used at a higher layer. The PPDU Tail bit may be used to return an encoder to a zero state. The padding bit may be used to adjust the length of the data field to a predetermined length.

The MAC header includes a frame control field, a duration/ID field, an address field, etc. The frame control field may include control information necessary to transmit/receive a frame. The duration/ID field may be set to a time for transmitting the frame. For a detailed description of sequence control, QoS control, and HT control subfields of the MAC header, refer to the IEEE 802.11-2012 standard.

The frame control field of the MAC header may include a Protocol Version subfield, a Type subfield, a Subtype subfield, a To DS From DS subfield, a More Fragment subfield, a Retry subfield, a Power Management subfield, a More Data subfield, a Protected Frame subfield, and an Order subfield. For a detailed description of the subfields of the frame control field, refer to the IEEE 802.11-2012 standard.

A null-data packet (NDP) frame format means a frame format which does not include a data packet. That is, the NDP frame includes only a PLCP header portion (that is, the STF field, the LTF field and the SIG field) in a general PPDU format but does not include the remaining portion (that is, the data field). The NDP frame may be referred to as a short frame format.

Improved Scanning Method

An STA may perform a scanning procedure in order to find an AP. As described above, the scanning procedure includes a passive scanning method and an active scanning method.

The passive scanning method refers to a process of, at an STA, receiving a beacon frame via a channel (without transmitting a probe request frame) to find an AP.

The active scanning method refers to a process in which an STA broadcasts a probe request frame and an AP, which has received the probe request frame, replies with a probe response frame.

The probe request frame includes an SSID field and the SSID value may be set to an ID value of the AP which is desired to be found by the STA. The AP, which has received the probe request frame including the SSID field, may reply with the probe response frame only when the received SSID is identical to the SSID thereof. Here, the probe response frame is unicast transmitted to the STA.

The STA, which has transmitted the probe request frame, confirms a CCA value at the PHY during a time corresponding to a MinChannelTime. The CCA value indicates whether the channel is idle or busy. After the probe request frame has been transmitted, if it is determined that the channel is not busy during the MinChannelTime using the CCA value, the STA no longer scans the channel.

After the probe request frame has been transmitted, if it is determined that the channel is busy during the MinChannelTime using the CCA value, the STA waits for a MaxChannelTime in order to scan the channel. In general, the MinChannelTime may be 5 ms and the MaxChannelTime may be 10 ms.

In the pre-defined active scanning procedure, the STA performs the following steps a) to f) with respect to the channel to be scanned.

a) The STA waits until a time corresponding to a ProbeDelay value has expired or until a PHYRxStart.indication primitive has been received. The ProbeDelay value is a delay value (in microseconds) used before transmitting the probe frame during active scanning. The PHYRxStart.indication primitive is an indication by the PHY layer to the local MAC entity that the PLCP has received a valid start of a PPDU, including a valid PLCP header.

b) A basic access procedure is performed. The basic access procedure means a mechanism for determining whether the STA will perform transmission using a DCF. For a detailed description thereof, refer to chapter 9.3.4.2 of IEEE 802.11-2012.

c) A probe request is sent to a broadcast destination address. The probe request frame may include an SSID and a BSSID acquired from the MLME-SCAN.request primitive. The MLME-SCAN.request primitive includes information about a scanning request among services provided to the SME by the MLME. If the SSID list is present in the MLME-SCAN.request, one or more probe request frames are transmitted and each probe request frame includes a BSSID indicated by the MLME-SCAN.request and an SSID indicated by the SSID list.

d) A ProbeTimer is set to 0 and a timer starts.

e) When a PHY-CCA.indication primitive indicating a busy channel has not been detected before the ProbeTimer reaches the MinChannelTime value, an NAV is set to 0 and a next channel is scanned. (The PHY-CCA.indication primitive indicates the current state of a medium to the local MAC entity). Otherwise, when the ProbeTimer reaches the MaxChannelTime value, all received probe responses are processed.

f) The NAV is set to 0 and a next channel is scanned.

In order to reduce power consumption of the STA during the scanning procedure, the scanning frequency should be reduced or a time required for scanning should be shortened. Hereinafter, embodiments of the present invention including efficient improvements capable of reducing power consumption of the STA as compared to a conventional scanning method will be described.

Figure 15:
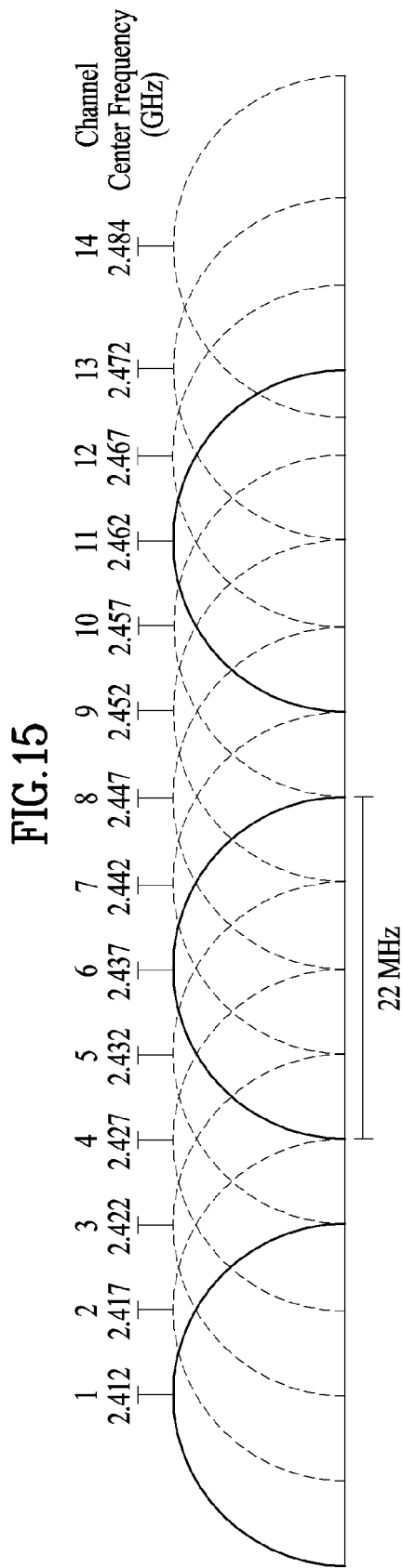
FIG. 15 is a diagram illustrating a channel set which may be used by an STA in a frequency band of 2.4 GHz.

FIG. 15 is a diagram showing a channel set which may be used by an STA.

FIG. 15 shows a channel set which may be used by an STA in a frequency band of 2.4 GHz.

In the example of FIG. 15, if an AP configures a BSS using channel 6, a signal transmitted by the AP acts as an interference signal at channels 3, 4, 5, 7, and 9. An interference signal having a higher strength is generated in a channel closer to channel 6. Accordingly, when the AP and the STA perform communication on channel 6, a probability that the CCA value of the STA at the channels 5 and 7 indicates a busy state is very high.

If the AP configures a BSS using channel 6, assume that a first STA for performing scanning transmits a probe request frame at channel 7 and communication between the AP and a second STA is performed at channel 6. In this case, due to frame transmission and reception between the AP and the second STA at channel 6, the first STA may detect a busy medium. In this case, the first STA waits for the MaxChannelTime, not for the MinChannelTime in order to scan the channel (that is, channel 7). If the CCA value indicating that channel 7 is in a busy state is not present, the first STA transmits the probe request frame, scans the channel only during the MinChannelTime and immediately scans a next channel. However, since an interference signal caused by communication of another BSS at channel 6 enables the STA for performing scanning at channel 7 to perform scanning at that channel for a longer time, the first STA unnecessarily performs scanning at channel 7 for a longer time.

The present invention proposes a method of solving a problem that a scanning time increases due to an interference signal generated at neighboring channels in a frequency band (e.g., 2.4 GHz) composed of partially overlapping channels.

In order to solve such a problem, in the present invention, although an STA, which has transmitted a probe request frame, detects a CCA value indicating a busy state during the MinChannelTime, if a normal preamble has not been received, STA operation may be defined such that the current channel is no longer scanned and a next channel is scanned.

That is, only when the STA, which has transmitted the probe request frame, receives the normal preamble during the MinChannelTime, the current channel may be scanned during the MaxChannelTime. Otherwise (that is, when the STA, which has transmitted the probe request frame, does not receive the normal preamble), the STA sets the NAV thereof to 0 and scans another channel.

According to the active scanning method proposed by the present invention, the STA may perform the following steps a) to f) with respect to each channel to be scanned. As compared to steps a) to f) of the above-described conventional active scanning method, in the active scanning method proposed by the present invention, steps a) to d) and f) are equally performed and only step e) is modified. That is, in steps a) to f) of the conventional active scanning method, step e) may be replaced with the following step e'). Step e') proposed by the present invention will now be described.

e') When a PMD_CS.indication primitive indicating a busy channel is not detected before the ProbeTimer reaches the MinChannelTime value, the NAV is set to 0 and a next channel is scanned. Otherwise, when the ProbeTimer reaches the MaxChannelTime value, all received probe responses are processed.

Here, the PMD_CS.indication primitive is generated by a physical medium dependent (PMD) entity and shall indicate to the PLCP layer that the receiver has acquired a PN code and data are being demodulated. Table 1 below shows an example of defining the PMD_CS.indication primitive. For a detailed description thereof, referred to the IEEE 802.11-2012 standard.

TABLE 1

| PMD_CS.indication |
|---|
| Function |
| This primitive, which is generated by the PMD, shall indicate to the PLCP layer that the receiver has acquired (locked) the PN code and data are being demodulated.<br>Semantics of the service primitive |
| The PMD_CS (carrier sense) primitive in conjunction with PMD_ED provides CCA status through the PLCP layer PHY-CCA primitive. PMD_CS indicates a binary status of ENABLED or DISABLED. PMD_CS shall be ENABLED when the correlator SQ indicated in PMD_SQ is greater than the CS_THRESHOLD parameter. PMD_CS shall be DISABLED when the PMD_SQ falls below the correlation threshold.<br>When generated |
| This primitive shall be generated by the PHY when the DSSS PHY is receiving a PPDU and the PN code has been acquired.<br>Effect of receipt |
| This indicator shall be provided to the PLCP for forwarding to the MAC entity for information purposes through the PHY-CCA indicator. This parameter shall indicate that the RF medium is busy and occupied by a DSSS PHY signal. The DSSS PHY should not be placed into the transmit state when PMD_CS is ENABLED. |

If the STA supports CCA Mode 2 or CCA Mode 3, a PMD_CS.indication (busy) primitive indicating a busy medium is called only when a valid direct sequence spread spectrum (DSSS) signal is detected.

The DSSS PHY supports three CCA Modes. CCA Mode 1 is defined to be related to detection of energy above a threshold. CCA shall report a busy medium upon detection of any energy above an energy detection (ED) threshold. CCA Mode 2 is defined to be only used for carrier sensing (CS). CCA shall report a busy medium only upon detection of a DSSS signal (this signal may be above or below an ED threshold). CCA Mode 3 is defined to simultaneously apply detection of energy above a threshold and CS. CCA shall report a busy medium upon detection of a DSSS signal with energy above an ED threshold.

That is, if the STA supports CCA Mode 2 or CCA Mode 3, according to the active scanning method proposed by the present invention, the STA, which has transmitted the probe request frame, may stop scanning of the current channel, move to another channel and perform scanning, when the PMD_CS.indication (busy) primitive indicating a busy medium is not detected before the MinChannelTime has expired.

If the STA does not support CCA Mode 2 or CCA Mode 3, the active scanning method proposed by the present invention may be defined as follows. As compared to steps a) to f) of the above-described conventional active scanning method, in the active scanning method proposed by the present invention, steps a) to d) and f) are equally performed, and only step e) is modified. That is, in steps a) to f) of the conventional active scanning method, step e) may be replaced with the following step e'). Step e') proposed by the present invention will now be described.

e') When a PHY-RXSTART.indication is not received before the ProbeTimer reaches the MinChannelTime value, the NAV is set to 0 and the next channel is scanned. Otherwise, when the ProbeTimer reaches the MaxChannelTime value, all received probe responses are processed.

Table 2 below shows an example of defining the PHY-RXSTART.indication primitive. For a detailed description thereof, refer to the IEEE 802.11-2012 standard.

TABLE 2

| PHY-RXSTART.indication |
|---|
| Function |
| This primitive is an indication by the PHY to the local MAC entity that the PLCP has received a valid start of a PPDU, including a valid PLCP header. |
| Semantics of the service primitive |
| The primitive provides the following parameter: PHY-RXSTART.indication( RXVECTOR ) The RXVECTOR represents a list of parameters that the PHY provides the local MAC entity upon receipt of a valid PLCP header or upon receipt of the last PSDU data bit in the received frame. The required parameters are listed in 7.3.4.5. |
| When generated |
| This primitive is generated by the local PHY entity to the MAC sublayer when the PHY has successfully validated the PLCP header at the start of a new PPDU. After generating a PHYRXSTART.indication primitive, the PHY is expected to maintain physical medium busy status (not generating a PHY-CCA.indication(IDLE) primitive) during the period required by that PHY to transfer a frame of the indicated LENGTH at the indicated DATARATE. This physical medium busy condition should be maintained even if a PHY-RXEND.indication(CarrierLost) or a PHYRXEND.indication(Format-Violation) primitive is generated by the PHY prior to the end of this period. |
| Effect of receipt |
| The effect of receipt of this primitive by the MAC is unspecified. |

If the STA does not support CCA Mode 2 or CCA Mode 3, according to the active scanning method proposed by the present invention, the STA, which has transmitted the probe request frame, may stop scanning of the current channel, move to another channel and perform scanning, when the PHY_RXSTART.indication primitive is not received before the MinChannelTime has expired.

As compared to the conventional method which should wait until the ProbeTimer reaches the MaxChannelTime in a busy medium, according to the active scanning method proposed by the present invention, the STA waits for the MaxChannelTime only when the the PMD_CS.indication (busy) primitive indicating a busy medium is detected or the PHY-RXSTART.indication indicating that a valid preamble has been detected is received and, otherwise, waits for the MinChannelTime and scans a next channel. Therefore, a time required for scanning is reduced.

While the above-described examples of the present invention relate to a method of reducing a time required for scanning an individual channel, the below-described examples of the present invention relate to a method of reducing power consumed in an entire scanning procedure by transmitting a probe request frame in wideband to reduce the number of times of scanning attempted by an STA.

In an active scanning method, the STA broadcasts a probe request frame according to channel and waits for a probe response frame. In general, the probe request frame transmitted by the STA is transmitted with a channel bandwidth capable of being received by all APs.

For example, as in IEEE 802.11ah, in a system operating in a band of sub 1 GHz (S1G), a BSS may support a channel bandwidth such as 1 MHz, 2 MHz, 4 MHz, 8 MHz or 16 MHz. If all APs may receive transmission of channel widths of 1 MHz and 2 MHz, the STA may transmit the probe request frame using channel widths of 1 MHz and 2 MHz.

If it is assumed that the total bandwidth of the channel, scanning of which is performed, is 26 MHz and the probe request frame is transmitted with channel bandwidth of 1 MHz, a probe request/response process should be performed a total of 26 times. If the probe request frame is transmitted with channel bandwidth of 2 MHz, the probe request/response process should be performed a total of 13 times. That is, as the channel width used for the probe process is increased, the total number of times of performing active scanning is decreased.

According to one example of the present invention, the channel bandwidth of the probe request frame transmitted by the STA may become equal to highest bandwidth among the channel bandwidths commonly supported by all APs.

Assume that there is a plurality of channel widths supported by an AP (or channel widths capable of being received by an AP). For example, assume that the AP supports a first channel width and a second channel width. If the AP receives a probe request frame from the STA in the first channel width (e.g., receives the probe request frame using a 1-MHz PPDU), the probe response frame transmitted by the AP should be transmitted on the first channel width (e.g., the probe response frame should be transmitted using a 1-MHz PPDU). In addition, if the AP receives a probe request frame from the STA in the second channel width (e.g., receives the probe request frame using a 2-MHz PPDU), the probe response frame transmitted by the AP should be transmitted in the second channel width (e.g., the probe response frame should be transmitted using a 2-MHz PPDU).

That is, when the AP receives the probe request frame in the second channel width, the probe response frame cannot be transmitted in the first channel width. Similarly, when the AP receives the probe request frame in the first channel width, the probe response frame cannot be transmitted in the second channel width.

The reason why the channel width of the channel response frame should be equal to that of the channel request frame is as follows. For example, if the STA transmits the probe request frame in the channel width of 2 MHz and the AP transmits the probe response frame in the channel width of 1 MHz narrower than 2 MHz, two different APs may simultaneously transmit probe response frames in the channel width of 1 MHz. In this case, the STA may not receive the probe response frames simultaneously transmitted by the APs. In the present invention, the channel width of the probe response frame is restricted to be equal to that of the probe request frame, in order to solve such a problem.

In addition, when the AP receives the probe request frame using a 2-MHz PPDU and transmits the probe response frame using a 2-MHz PPDU, the AP may notify the STA of information about the 1-MHz channel serviced thereby. Therefore, when the STA which is performing scanning is associated with the AP, an association request/response frame is permitted to be transmitted and received using a 1-MHz PPDU. If information about where the 1-MHz channel of the AP is located is not included in the probe response frame transmitted using the 2-MHz PPDU, when the STA transmits the association request frame to the AP, the 1-MHz PPDU cannot be used and only the 2-MHz PPDU should be used.

Accordingly, in the present invention, information about the 1-MHz channel which is being serviced by the AP (in particular, location information) is included in the frame control (FC) field of the probe response frame transmitted by the AP.

Figures 16, 17, 18:
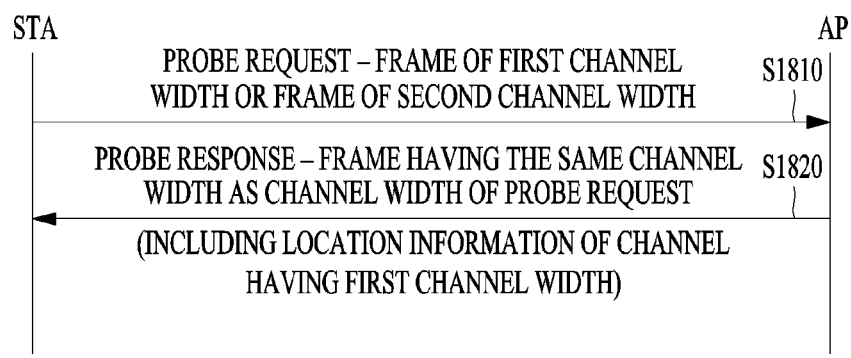
FIG. 16 is a diagram showing an exemplary format of a probe response frame.
FIG. 17 is a diagram showing an exemplary format of a frame control field of a probe response frame.
FIG. 18 is a diagram illustrating a scanning method according to an example of the present invention.

FIG. 16 is a diagram showing an exemplary format of a probe response frame.

The FC field of the probe response frame may include one or more of the subfields shown in FIG. 17.

A destination address (DA) field is set to a value indicating a destination address and a source address (SA) field is set to a value indicating a source address.

A timestamp field is set to a value of 4 least significant bytes (LSBs) of a timing synchronization function (TSF) timer value of an STA (e.g., an AP STA) for transmitting a probe response frame.

A change sequence field has an initial value set to 0 and is set to a value increased by 1 when important update of system information occurs.

A next target beacon transmission time (TBTT) field may be set to a value of 3 most significant bytes (MSBs) of four LSBs of a next TBTT value. The next TBTT field may be optionally included.

A compressed SSID field is set to a 32-bit cyclic redundancy check (CRC) value of a full SSID of an AP. If the full SSID is required to be included in a probe response frame, the full SSID field may be included in an optional IEs part.

An access network options field specifies access network properties of an AP which is desired to be found by the STA or from which a response is desired to be received. Only a network (or an AP) supporting such properties or such a service may respond to the probe request frame. The access network options field may be optionally included.

Other optional elements may be included in the optional IEs part.

FIG. 17 is a diagram showing an exemplary format of a frame control field of a probe response frame.

As described above, the frame control (FC) field of the probe response frame may include information indicating the location of the channel having a size of a first channel width (e.g. 1 MHz) of a BSS. For example, information indicating whether the channel having the first channel width (e.g., 1 MHz) is located at the upper side or lower side of the channel having a size of a second channel width (e.g., 2 MHz) may be included in the FC field.

In addition, the FC field may include one or more of a next TBTT present field, a full SSID present field, an interworking present field, a BSS bandwidth field and a security field. Using a combination of one or more of such fields or a new field other than such fields, information indicating the location of the 1-MHz channel of the BSS may be indicated.

If the next TBTT field is included in the probe response frame, the next TBTT present field is set to 1 and, otherwise, is set to 0.

The full SSID present field may indicate whether full SSID information or compressed SSID information is included in the probe response frame. If the full SSID present field is set to 1, this indicates that the full SSID information is included in the probe response frame and, if the full SSID present field is set to 0, this indicates that the compressed SSID information is included in the probe response frame.

The interworking present field is set to 1 when the access network options field is present in the probe response frame and, otherwise, is set to 0.

The security field is set to 1 when the AP is an RSNA AP and, otherwise, is set to 0.

The BSS bandwidth field indicates information about the current operation bandwidth of the BSS. For example, the location of the channel having the first channel width (e.g., 1 MHz) may be indicated using the BSS bandwidth field as shown in Table 3 below. However, the indication of the location of the channel having the first channel width (e.g., 1 MHz) using the BSS bandwidth field is only an example of the present invention and the scope of the present invention is not limited thereto.

TABLE 3

| BSS BW Value | Description |
| --- | --- |
| 0 | Supported Minimum Channel Width: 1 MHz<br>Supported Maximum Channel Width: 1 MHz<br>Location of 1 MHz Channel: Lower side on 2 MHz Primary Channel |
| 1 | Supported Minimum Channel Width: 1 MHz<br>Supported Maximum Channel Width: 1 MHz<br>Location of 1 MHz Channel: Upper side on 2 MHz Primary Channel |
| 2 | Supported Minimum Channel Width: 1 MHz<br>Supported Maximum Channel Width: 2 MHz<br>Location of 1 MHz Channel: Lower side on 2 MHz Primary Channel |
| 3 | Supported Minimum Channel Width: 1 MHz<br>Supported Maximum Channel Width: 2 MHz<br>Location of 1 MHz Channel: Upper side on 2 MHz Primary Channel |
| 4 | Supported Minimum Channel Width: 1 MHz<br>Supported Maximum Channel Width: 4 MHz<br>Location of 1 MHz Channel: Lower side on 2 MHz Primary Channel |
| 5 | Supported Minimum Channel Width: 1 MHz<br>Supported Maximum Channel Width: 4 MHz<br>Location of 1 MHz Channel: Upper side on 2 MHz Primary Channel |
| 6 | Supported Minimum Channel Width: 1 MHz<br>Supported Maximum Channel Width: 8 MHz<br>Location of 1 MHz Channel: Lower side on 2 MHz Primary Channel |

TABLE 3-continued

| BSS BW Value | Description |
| --- | --- |
| 7 | Supported Minimum Channel Width: 1 MHz<br>Supported Maximum Channel Width: 8 MHz<br>Location of 1 MHz Channel: Upper side on 2 MHz Primary Channel |
| 8 | Supported Minimum Channel Width: 1 MHz<br>Supported Maximum Channel Width: 16 MHz<br>Location of 1 MHz Channel: Lower side on 2 MHz Primary Channel |
| 9 | Supported Minimum Channel Width: 1 MHz<br>Supported Maximum Channel Width: 16 MHz<br>Location of 1 MHz Channel: Upper side on 2 MHz Primary Channel |
| 10 | Supported Minimum Channel Width: 2 MHz<br>Supported Maximum Channel Width: 2 MHz |
| 11 | Supported Minimum Channel Width: 2 MHz<br>Supported Maximum Channel Width: 4 MHz |
| 12 | Supported Minimum Channel Width: 2 MHz<br>Supported Maximum Channel Width: 8 MHz |
| 13 | Supported Minimum Channel Width: 2 MHz<br>Supported Maximum Channel Width: 16 MHz |
| 14-15 | Reserved |

Using the frame control (FC) field of the probe response frame, whether the channel having the first channel width (e.g., 1 MHz), which is being serviced by the AP, is located at the upper side or lower side of the channel having the second channel width (e.g., 2 MHz) may be indicated to the STA. Therefore, the STA may clearly confirm the location of the 1-MHz channel of the AP (or the BSS) after performing transmission and reception of the probe request/response frame in the 2-MHz channel width, and thus may perform transmission and reception of the association request/response frame in the 1-MHz channel width.

FIG. 18 is a diagram illustrating a scanning method according to an example of the present invention.

In step S1810, an STA may transmit a probe request frame to an AP. The probe request frame may be transmitted as a frame of a first channel width (e.g., 1 MHz) or a frame of a second channel width (e.g., 1 MHz).

Additionally, the STA may wait for a MAXChannelTime only when a PMD_CS.indication (busy) primitive indicating a busy medium is detected or a PHY-RXSTART.indication primitive indicating that a valid preamble has been detected is received after transmitting the probe request frame and setting a ProbeTimer to 0 and, otherwise, wait for a MIN-ChannelTime only and scan a next channel.

In step S1820, the AP, which has determined to respond to the probe request frame, may transmit a probe response frame to the STA. Here, the probe response frame transmitted by the AP is transmitted in the same channel width as the channel width of the probe request frame received from the STA. For example, If the probe request frame is received in the first channel width, the probe response frame is transmitted in the first channel width. That is, if the probe request frame is received in the first channel width, the probe response frame is not permitted to be transmitted in the second channel width.

If the probe request frame is received in the second channel width, the probe response frame is transmitted in the second channel width. That is, if the probe request frame is received in the second channel width, the probe response frame is not permitted to be transmitted in the first channel width.

In addition, the probe response frame may further include information about the location of the channel having the first channel width (if the first channel width is narrower than the second channel width). For example, if the channel having the first channel width is a 1-MHz channel, information indicating whether the 1-MHz channel is located at the upper side or lower side of the 2-MHz channel may be included in the probe response frame (e.g., the FC field of the probe response frame).

Although the exemplary method described with reference to FIG. 18 is described as a series of operations for simplicity of description, the order of steps is not limited thereto and, if necessary, steps may be performed simultaneously or in different orders. All steps of FIG. 18 are not necessarily required to implement the method proposed by the present invention.

In the method of the present invention described with reference to FIG. 18, details described in the above embodiments of the present invention are independently applied or two or more embodiments are simultaneously applied.

Figure 19:
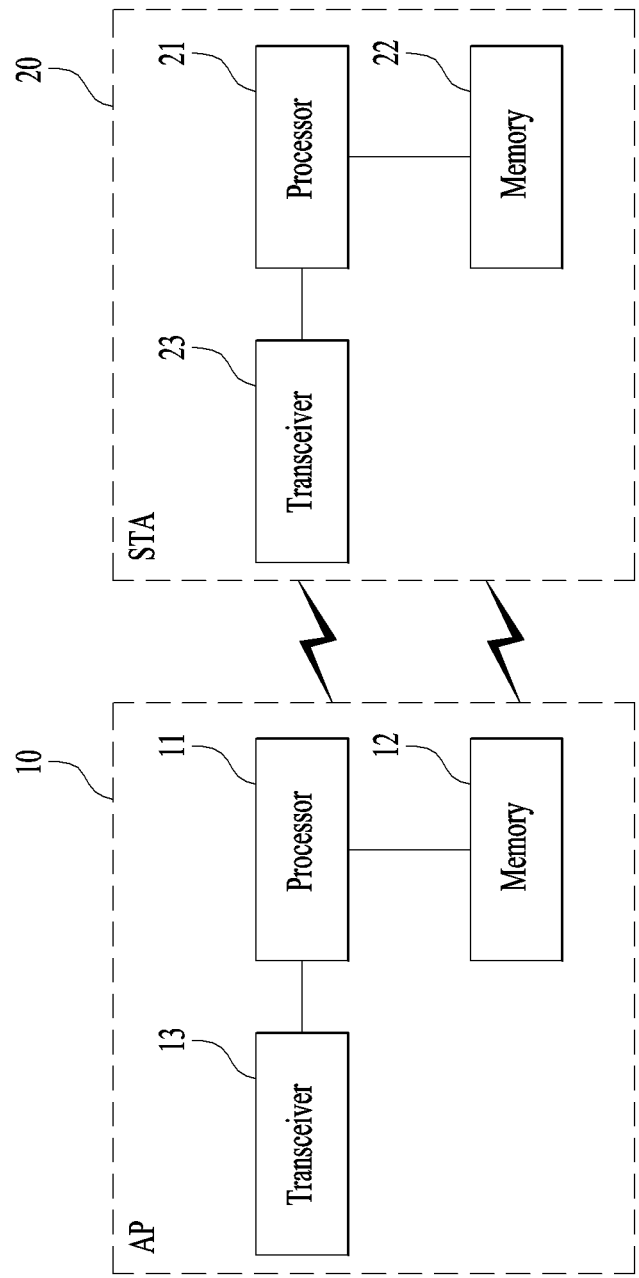
FIG. 19 is a block diagram showing the configuration of a wireless apparatus according to one embodiment of the present invention.

FIG. 19 is a block diagram showing the configuration of a wireless apparatus according to one embodiment of the present invention.

The AP 10 may include a processor 11, a memory 12 and a transceiver 13. The STA 20 may include a processor 21, a memory 22 and a transceiver 23. The transceivers 13 and 23 may transmit/receive a radio frequency (RF) signal and implement a physical layer according to an IEEE 802 system, for example. The processors 11 and 21 may be respectively connected to the transceivers 13 and 23 to implement a physical layer and/or a MAC layer according to the IEEE 802 system. The processors 11 and 21 may be configured to perform operations according to the various embodiments of the present invention described above. In addition, modules implementing operations of the AP and the STA according to the above-described embodiments of the present invention may be stored in the memories 12 and 22 and may be executed by the processors 11 and 21, respectively. The memories 12 and 22 may be mounted inside or outside the processors 11 and 21 to be connected to the processors 11 and 21 by known means, respectively.

The AP 10 of FIG. 19 may be configured to support scanning of the STA 20. The AP 10 may support first and second channel widths. The processor 11 may be configured to receive the probe request frame using the transceiver 13 in the first channel width or the second channel width. The processor 11 may be configured to transmit the probe response frame to the STA 20 using the transceiver 13 in response to the probe request frame. Here, the channel width of the probe response frame may be equal to that of the probe request frame.

The STA 20 of FIG. 19 may be configured to perform scanning. The processor 21 may be configured to transmit, to the AP 10 supporting the first and second channel widths, the probe request frame using the transceiver 23 in the first channel width or the second channel width. The processor 21 may be configured to receive the probe response frame from the AP 10 using the transceiver 13 in response to the probe request frame. Here, the channel width of the probe response frame may be equal to that of the probe request frame.

The detailed configuration of the AP 10 and the STA 20 of FIG. 19 may be implemented such that details described in the above embodiments of the present invention are independently applied or two or more embodiments are simultaneously applied. In this case, overlapping details have been omitted from the description for clarity.

The above-described embodiments of the present invention can be implemented by a variety of means, for example, hardware, firmware, software, or a combination thereof.

In the case of implementing the present invention by hardware, the present invention can be implemented with application specific integrated circuits (ASICs), digital signal processors (DSPs) digital signal processing devices (DSPDs) programmable logic devices (PLDs) field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory unit so that it can be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

Although the above-described various embodiments of the present invention are described based on the IEEE 802.11 system, the embodiments of the present invention are applicable to various mobile communication systems.

The invention claimed is:

1. A method of supporting scanning of a station (STA) at an access point (AP) in a wireless local area network (WLAN) system, the method comprising:
   receiving, at the AP having a 1 MHz width channel and a 2 MHz width channel, a probe request frame from the STA; and
   transmitting a probe response frame to the STA in response to the probe request frame,
   wherein, when the probe request frame is received through the 1 MHz width channel, the AP transmits the probe response frame using the 1 MHz width channel,
   wherein, when the probe request frame is received through the 2 MHz width channel, the AP transmits the probe response frame using the 2 MHz width channel,
   wherein in using the 2 MHz width channel for transmitting the probe response frame, the AP has to entirely use the 2 MHz width channel and the AP is not allowed to transmit the probe response frame using only a part of the 2 MHz width channel where the probe request frame is received, and
   wherein the 1 MHz width channel is entirely encompassed within the 2 MHz width channel, and the probe response frame includes frame control information indicating whether the 1 MHz width channel is located on a lower side of the 2 MHz width channel or an upper side of the 2 MHz width channel.

2. The method according to claim 1, wherein when a value of the frame control information is set to 0, the 1 MHz channel is located at the lower side of the 2 MHz width channel.

3. The method according to claim 2, when a value of the frame control information is set to 1, the 1 MHz channel is located at the upper side of the 2 MHz width channel.

4. The method according to claim 3, wherein the frame control information is included in a frame control (FC) field of the probe response frame.

5. A method of performing scanning at a station (STA) in a wireless local area network (WLAN) system, the method comprising:
   transmitting, to an access point (AP) having a 1 MHz width channel and a 2 MHz width channel, a probe request frame; and
   receiving a probe response frame from the AP in response to the probe request frame,
   wherein, when the probe request frame is transmitted through the 1 MHz width channel, the STA receives the probe response frame using the 1 MHz width channel,
   wherein, when the probe request frame is transmitted through the 2 MHz width channel, the STA receives the probe response frame using the 2 MHz width channel,
   wherein in using the 2 MHz width channel for receiving the probe response frame, the STA entirely uses the 2 MHz width channel and the STA does not receive the probe response frame using only a part of the 2 MHz width channel where the probe request frame is transmitted, and
   wherein the 1 MHz width channel is entirely encompassed within the 2 MHz width channel, and the probe response frame includes frame control information indicating whether the 1 MHz width channel is located on a lower side of the 2 MHz width channel or an upper side of the 2 MHz width channel.

6. An access point (AP) apparatus for supporting scanning of a station (STA) in a wireless local area network (WLAN) system, the AP apparatus comprising:
   a transceiver; and
   a processor,
   wherein the AP apparatus has a 1 MHz width channel and a 2 MHz width channel,
   wherein the processor is configured to receive a probe request frame from the STA using the transceiver and to transmit a probe response frame to the STA using the transceiver in response to the probe request frame,
   wherein, when the probe request frame is received through the 1 MHz width channel, the processor transmits the probe response frame using the 1 MHz width channel,
   wherein if the probe request frame is received through the 2 MHz width channel, the processor transmits the probe response frame using the 2 MHz width channel,
   wherein in using the 2 MHz width channel for transmitting the probe response frame, the processor has to entirely use the 2 MHz width channel and the processor is not allowed to transmit the probe response frame using only a part of the 2 MHz width channel where the probe request frame is received, and
   wherein the 1 MHz width channel is entirely encompassed within the 2 MHz width channel, and the probe response frame includes frame control information indicating whether the 1 MHz width channel is located on a lower side of the 2 MHz width channel or an upper side of the 2 MHz width channel.

7. A station (STA) apparatus for performing scanning in a wireless local area network (WLAN) system, the STA apparatus comprising:
   a transceiver; and
   a processor, wherein the processor is configured to transmit, to an access point (AP) having a 1 MHz width channel and a 2 MHz width channel, a probe request frame using the transceiver and to receive a probe response frame from the AP using the transceiver in response to the probe request frame, wherein, when the probe request frame is transmitted through the 1 MHz width channel, the processor receives the probe response frame using the 1 MHz width channel, wherein when the probe request frame is transmitted through the 2 MHz width channel, the processor receives the probe response frame using the 2 MHz width channel, wherein in using the 2 MHz width channel for receiving the probe response frame, the processor entirely uses the 2 MHz width channel and the processor does not receive the probe response frame using only a part of the 2 MHz width channel where the probe request frame is transmitted, and wherein the 1 MHz width channel is entirely encompassed within the 2 MHz width channel, and the probe response frame includes frame control information indicating whether the 1 MHz width channel is located on a lower side of the 2 MHz width channel or an upper side of the 2 MHz width channel.

8. The method according to claim 1, when a value of the frame control information is set to 1, the 1 MHz channel is located at the upper side of the 2 MHz width channel.

9. The method according to claim 8, wherein the frame control information is included in a frame control (FC) field of the probe response frame.

* * * * *